(12) United States Patent
Yang et al.

(10) Patent No.: US 12,477,525 B2
(45) Date of Patent: Nov. 18, 2025

(54) FEEDBACK DESIGN FOR MULTI-TRANSMISSION RECEPTION POINT TRANSMISSION

(71) Applicant: QUALCOMM Incorporated, San Diego, CA (US)

(72) Inventors: Wei Yang, San Diego, CA (US); Yi Huang, San Diego, CA (US); Joseph Binamira Soriaga, San Diego, CA (US); Gokul Sridharan, Sunnyvale, CA (US); Jay Kumar Sundararajan, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/166,334

(22) Filed: Feb. 8, 2023

(65) Prior Publication Data

US 2023/0189226 A1    Jun. 15, 2023

Related U.S. Application Data

(63) Continuation of application No. 17/334,176, filed on May 28, 2021, which is a continuation of application
(Continued)

(51) Int. Cl.
*H04W 72/0446* (2023.01)
*H04W 72/21* (2023.01)
*H04W 72/23* (2023.01)

(52) U.S. Cl.
CPC ....... *H04W 72/0446* (2013.01); *H04W 72/21* (2023.01); *H04W 72/23* (2023.01)

(58) Field of Classification Search
CPC .. H04W 72/23; H04W 72/21; H04W 72/0446
See application file for complete search history.

(56) References Cited

U.S. PATENT DOCUMENTS

| 11,026,226 | B2 | 6/2021 | Yang et al. |
| 2009/0129259 | A1 | 5/2009 | Malladi et al. |

(Continued)

FOREIGN PATENT DOCUMENTS

| WO | WO-2016122273 A1 | 8/2016 |
| WO | WO-2017222277 A1 | 12/2017 |
| WO | WO-2018062937 A1 | 4/2018 |

OTHER PUBLICATIONS

5G NR Quasi-Colocation Concept, Types and Application by Author • Published Nov. 30, 2019 • Updated Jul. 21, 2020 (Year: 2019).*
(Continued)

*Primary Examiner* — Kevin M Cunningham
(74) *Attorney, Agent, or Firm* — Holland & Hart LLP

(57) ABSTRACT

Methods, systems, and devices for wireless communications are described. A user equipment (UE) may receive a configuration message configuring the UE to communicate coordinated transmissions with multiple transmission reception points (TRPs) using a first coordinated transmission mode of a set of different coordinated transmission modes. The UE may receive, based on the configuration message, downlink control information including at least one indicator and receive a first coordinated transmission communicated in accordance with the first coordinated transmission mode. The UE may transmit, in accordance with a feedback configuration corresponding to the at least one indicator and the first coordinated transmission mode, a feedback message for the first coordinated transmission to at least one of the multiple TRPs.

20 Claims, 20 Drawing Sheets

Related U.S. Application Data

No. 16/457,532, filed on Jun. 28, 2019, now Pat. No. 11,026,226.

(60) Provisional application No. 62/694,959, filed on Jul. 6, 2018.

(56) References Cited

U.S. PATENT DOCUMENTS

| | | | |
|---|---|---|---|
| 2012/0176991 | A1 | 7/2012 | Chen et al. |
| 2015/0139136 | A1 | 5/2015 | Zhang et al. |
| 2015/0180625 | A1 | 6/2015 | Park et al. |
| 2015/0358888 | A1 | 12/2015 | Gulati et al. |
| 2017/0134140 | A1 | 5/2017 | Park |
| 2017/0272220 | A1 | 9/2017 | Chen et al. |
| 2017/0325258 | A1* | 11/2017 | Nogami ............... H04L 1/0068 |
| 2018/0070341 | A1* | 3/2018 | Islam .................. H04L 5/0064 |
| 2019/0053211 | A1 | 2/2019 | Ying et al. |
| 2019/0081750 | A1 | 3/2019 | Yang et al. |
| 2019/0124538 | A1* | 4/2019 | Tang ................... H04B 7/0632 |
| 2019/0222394 | A1 | 7/2019 | Medles et al. |
| 2019/0230498 | A1 | 7/2019 | Lee et al. |
| 2019/0349061 | A1* | 11/2019 | Cirik ................... H04L 1/1861 |
| 2019/0379506 | A1 | 12/2019 | Cheng |
| 2020/0007294 | A1* | 1/2020 | Yang .................. H04W 52/146 |
| 2020/0007296 | A1* | 1/2020 | Papasakellariou ...... H04L 5/001 |
| 2020/0014515 | A1 | 1/2020 | Qin et al. |
| 2020/0145088 | A1 | 5/2020 | Wang et al. |
| 2020/0154467 | A1* | 5/2020 | Gong ................... H04W 76/27 |
| 2021/0289497 | A1 | 9/2021 | Yang et al. |
| 2021/0329673 | A1* | 10/2021 | Gao ................... H04L 25/0226 |
| 2022/0287066 | A1* | 9/2022 | Xiong .................. H04B 7/063 |

OTHER PUBLICATIONS

International Preliminary Report on Patentability—PCT/US2019/040117, The International Bureau of WIPO—Geneva, Switzerland, Jan. 21, 2021 (184055WO).

International Search Report and Written Opinion—PCT/US2019/040117—ISA/EPO—Sep. 25, 2019 (184055WO).

NTT Docomo, et al., "HARQ-ACK Feedback", 3GPP Draft, 3GPP TSG RAN WG1 NR Ad-Hoc#3, R1-1716105, 3rd Generation Partnership Project (3GPP), Mobile Competence Centre, 650, Route Des Lucioles ; F-06921 Sophia-Antipolis Cedex ; France, vol. RAN WG1, No. Nagoya, Japan; Sep. 18, 2017-Sep. 21, 2017, Sep. 17, 2017 (Sep. 17, 2017), XP051339563, 11 Pages, Section 2.3, the whole document.

European Search Report—EP23188802—Search Authority—The Hague—Oct. 20, 2023 (184055EPD1).

Huawei, et al., "Solution and TP for Multi-TRP PDCCH Transmission", 3GPP TSG RAN WG1 Ad Hoc Meeting, R1-1800824, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018, XP051385096, 5 Pages, Paragraph [002]-Paragraph [02.5].

ZTE: "Multi-TRP Transmission and Interference Coordination", 3GPP TSG RAN WG1 NR Ad-Hoc#2, R1-1710180 Multi-TRP Transmission and Interference Coordination, 3rd Generation Partnership Project, Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299404, 7 Pages, Part 2.

* cited by examiner

Mode 1: 1 PDCCH + 1 PDSCH

Mode 2: 2 PDCCH + 1 PDSCH
(PDCCH repetition)

PDCCH 305

PDSCH 310

PUCCH 315

Mode 3: 2 PDCCH + 2 PDSCH
(Same Codeword)

PDCCH 405

PDSCH (Same Codeword) 410

PUCCH 415

400

FEEDBACK DESIGN FOR MULTI-TRANSMISSION RECEPTION POINT TRANSMISSION

CROSS REFERENCE

The present Application for Patent is a continuation of U.S. patent application Ser. No. 17/334,176 by YANG et al., entitled "FEEDBACK DESIGN FOR MULTI-TRANSMISSION RECEPTION POINT TRANSMISSION," filed May 28, 2021, which is a continuation of U.S. patent application Ser. No. 16/457,532 by YANG et al., entitled "FEEDBACK DESIGN FOR MULTI-TRANSMISSION RECEPTION POINT TRANSMISSION," filed Jun. 28, 2019, which claims the benefit of U.S. Provisional Patent Application No. 62/694,959 by YANG et al., entitled "FEEDBACK DESIGN FOR MULTI-TRANSMISSION RECEPTION POINT TRANSMISSION," filed Jul. 6, 2018, each of which is assigned to the assignee hereof, and each of which is expressly incorporated herein.

BACKGROUND

The following relates generally to wireless communications, and more specifically to multi-transmission reception point (multi-TRP) transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with two or more base stations (e.g., two or more transmission reception points (TRPs)) over time and frequency resources dedicated for communications between the TRPs and the UE. The TRPs may coordinate different configurations for the communications using backhaul links with minimal or zero delay. The TRPs and UE may have multiple different configurations for communication, which the TRPs may coordinate using backhaul links. Such coordination techniques, however, for the different configurations between the UE and the TRPs may introduce latency and increase signaling overhead.

SUMMARY

The described techniques relate to improved methods, systems, devices, or apparatuses that support feedback design for multi-transmission reception point (multi-TRP) transmission. Generally, the described techniques provide for coordinating communication between a set of transmission reception points (TRPs) and a user equipment (UE) that enables the UE to identify a configuration to use for transmitting feedback to at least one of the TRPs based on downlink control signaling and a coordinated transmission mode in which the UE is configured to operate.

In an example, a first TRP of the set of TRPs may transmit a configuration message for configuring a UE to communicate coordinated transmissions with the set of TRPs. The configuration message may indicate a first coordinated transmission mode of a set of different coordinated transmission modes. Each coordinated transmission mode may indicate a number of uplink and downlink control channels and a number of uplink and downlink data channels configured for communication between a particular TRP and the UE. The first TRP may transmit, based on the configuration message, downlink control information (DCI) that includes at least one indicator and a grant of resources for a downlink coordinated transmission from one of the TRPs to the UE.

In some cases, the DCI may include a downlink assignment index (DAI) indicator, an acknowledgment (ACK) or negative acknowledgment (NACK) (e.g., ACK/NACK) resource indicator (ARI), and a feedback gap indicator (e.g., a K1 value) which corresponds to a time gap between a physical downlink shared channel (PDSCH) message and when the UE is expected to send a corresponding physical uplink control channel (PUCCH) message carrying a feedback message for the PDSCH message. Based on the combination of DAI, ARI, and the feedback gap indicator, the UE may determine a feedback configuration for transmitting a feedback message (e.g., a hybrid automatic repeat request (HARD) message such as a HARQ-ACK or HARQ-NACK message) within a PUCCH message. The feedback configuration may indicate the number of ACK/NACK bits in the feedback message, the number of PUCCH resources allocated for reporting ACK/NACK feedback, the number of TRPs, to which TRPs the UE is to transmit the feedback message, or any combination thereof.

The UE may monitor the resources indicated in the grant and receive the coordinated transmission communicated in accordance with the configured transmission mode. The UE may determine whether it is able to successfully decode the coordinated transmission, and may transmit, in accordance with the feedback configuration corresponding to the at least one indicator and the first coordinated transmission mode, the feedback message for the coordinated transmission. According to some aspects, the UE may determine the feedback configuration without the TRP having to incur additional signaling overhead of explicitly indicating the feedback configuration to the UE.

A method of wireless communication at a UE is described. The method may include receiving a configuration message configuring the UE to communicate coordinated transmissions with a set of TRPs using a first coordinated transmission mode of a set of different coordinated transmission modes, receiving, based on the configuration message, DCI including at least one indicator, receiving a first coordinated transmission communicated in accordance with the first coordinated transmission mode, and transmitting, in accordance with a feedback configuration corresponding to the at least one indicator and the first coordinated transmission mode, a feedback message for the first coordinated transmission to at least one of the set of TRPs.

An apparatus for wireless communication at a UE is described. The apparatus may include a processor, memory in electronic communication with the processor, and instructions stored in the memory. The instructions may be executable by the processor to cause the apparatus to receive a configuration message configuring the UE to communicate coordinated transmissions with a set of TRPs using a first coordinated transmission mode of a set of different coordinated transmission modes, receive, based on the configuration message, DCI including at least one indicator, receive a first coordinated transmission communicated in accordance with the first coordinated transmission mode, and transmit, in accordance with a feedback configuration corresponding to the at least one indicator and the first coordinated transmission mode, a feedback message for the first coordinated transmission to at least one of the set of TRPs.

Another apparatus for wireless communication at a UE is described. The apparatus may include means for receiving a configuration message configuring the UE to communicate coordinated transmissions with a set of TRPs using a first coordinated transmission mode of a set of different coordinated transmission modes, receiving, based on the configuration message, DCI including at least one indicator, receiving a first coordinated transmission communicated in accordance with the first coordinated transmission mode, and transmitting, in accordance with a feedback configuration corresponding to the at least one indicator and the first coordinated transmission mode, a feedback message for the first coordinated transmission to at least one of the set of TRPs.

A non-transitory computer-readable medium storing code for wireless communication at a UE is described. The code may include instructions executable by a processor to receive a configuration message configuring the UE to communicate coordinated transmissions with a set of TRPs using a first coordinated transmission mode of a set of different coordinated transmission modes, receive, based on the configuration message, DCI including at least one indicator, receive a first coordinated transmission communicated in accordance with the first coordinated transmission mode, and transmit, in accordance with a feedback configuration corresponding to the at least one indicator and the first coordinated transmission mode, a feedback message for the first coordinated transmission to at least one of the set of TRPs.

Some examples of the method, apparatuses, and non-transitory computer-readable medium described herein may further include operations, features, means, or instructions for determining a number of information bits for the feedback message and a number of PUCCH transmissions in which to transmit the feedback message.

In some examples of the method, apparatuses, and non-transitory computer-readable medium described herein, the at least one indicator includes a DAI indicator, a feedback resource indicator, a feedback gap indicator, or any combination thereof.

Some examples of the method, apparatuses, and non-transitory computer-readable medium described herein may further include operations, features, means, or instructions for determining that the at least one indicator includes a first resource indicator indicating a first PUCCH resource in a time interval and a second resource indicator indicating a second PUCCH resource in the time interval that may be different than the first PUCCH resource, where the feedback message may be transmitted via each of the first PUCCH resource and the second PUCCH resource within the time interval.

In some examples of the method, apparatuses, and non-transitory computer-readable medium described herein, the time interval may be a slot or a mini-slot.

Some examples of the method, apparatuses, and non-transitory computer-readable medium described herein may further include operations, features, means, or instructions for identifying that the configuration message indicates that a PUCCH resource includes a first resource having first quasi co-location (QCL) information and a second resource having second QCL information, where the feedback message may be transmitted via the first resource in accordance with the first QCL information and the feedback message may be transmitted via the second resource in accordance with the second QCL information.

Some examples of the method, apparatuses, and non-transitory computer-readable medium described herein may further include operations, features, means, or instructions for determining that the at least one indicator includes a feedback resource indicator indicating a first PUCCH resource and a second PUCCH resource that may be different than the first PUCCH resource, where the feedback message may be transmitted via the first PUCCH resource and via the second PUCCH resource.

In some examples of the method, apparatuses, and non-transitory computer-readable medium described herein, receiving the DCI further may include operations, features, means, or instructions for receiving, within a same time interval, a first control channel transmission including the DCI from a first TRP of the set of TRPs and a second control channel transmission including second DCI from a second TRP of the set of TRPs, the second DCI including a second at least one indicator, determining, based on the first coordinated transmission mode, that the first control channel transmission schedules the first coordinated transmission and that the second control channel transmission schedules a second coordinated transmission, determining that the first coordinated transmission and the second coordinated transmission each include a same at least one codeword and a same at least one feedback process identifier associated with the at least one codeword, and determining that a number of information bits in the feedback message is the same as the number of codewords scheduled by the DCI.

Some examples of the method, apparatuses, and non-transitory computer-readable medium described herein may further include operations, features, means, or instructions for determining to transmit the feedback message for the first coordinated transmission and the second coordinated transmission in a single PUCCH transmission based on a first feedback gap indicator and a first feedback resource indicator included in the at least one indicator being the same as a second feedback gap indicator and a second feedback resource indicator included in the second at least one indicator.

In some examples of the method, apparatuses, and non-transitory computer-readable medium described herein, receiving the DCI further may include operations, features, means, or instructions for determining to transmit the feedback message for the first coordinated transmission and the second coordinated transmission in multiple PUCCH transmission based on at least one of a first feedback gap indicator or a first feedback resource indicator included in the at least one indicator differing from a second feedback gap indicator or a second feedback resource indicator included in the second at least one indicator.

In some examples of the method, apparatuses, and non-transitory computer-readable medium described herein, the DCI schedules one or two codewords.

In some examples of the method, apparatuses, and non-transitory computer-readable medium described herein, receiving the first coordinated transmission communicated in accordance with the first coordinated transmission mode further may include operations, features, means, or instructions for determining whether to decode the first coordinated transmission received from the first TRP based on a decoding decision for the second coordinated transmission received from the second TRP.

In some examples of the method, apparatuses, and non-transitory computer-readable medium described herein, receiving the DCI further may include operations, features, means, or instructions for receiving, within a same time interval, a first control channel transmission including the DCI from a first TRP of the set of TRPs and a second control channel transmission including second DCI from a second TRP of the set of TRPs, the second DCI including a second at least one indicator, determining, based on the first coordinated transmission mode, that the first control channel transmission schedules the first coordinated transmission and that a second control channel transmission schedules a second coordinated transmission and determining that the first coordinated transmission and the second coordinated transmission each include a different codeword and a different feedback identifier associated with each of the different codewords.

Some examples of the method, apparatuses, and non-transitory computer-readable medium described herein may further include operations, features, means, or instructions for determining to multiplex or bundle information bits corresponding to each of the first and second coordinated transmissions in a single PUCCH transmission based on determining that a first feedback gap indicator included in the at least one indicator may be the same as a second feedback gap indicator included in the second at least one indicator.

Some examples of the method, apparatuses, and non-transitory computer-readable medium described herein may further include operations, features, means, or instructions for determining to multiplex or bundle information bits may be based on the configuration message.

Some examples of the method, apparatuses, and non-transitory computer-readable medium described herein may further include operations, features, means, or instructions for identifying a feedback resource for transmitting the feedback resource based on a feedback indicator and a DAI indicator included in the at least one indicator associated with a defined monitoring occasion of the set of physical downlink control channel (PDCCH) monitoring occasions.

In some examples of the method, apparatuses, and non-transitory computer-readable medium described herein, the ordering of the set of PDCCH monitoring occasions corresponds to an ordering of a set of control resource set identifiers indicated in the configuration message.

In some examples of the method, apparatuses, and non-transitory computer-readable medium described herein, each of the set of control resource set identifiers may be respectively associated with the set of PDCCH monitoring occasion, and where each control resource set of a set of control resource sets corresponds to one of the set of control resource set identifiers and one of the TRPs.

Some examples of the method, apparatuses, and non-transitory computer-readable medium described herein may further include operations, features, means, or instructions for determining to transmit the feedback indicator in multiple PUCCH transmissions based on a first feedback gap indicator included in the at least one indicator differing from a second feedback gap indicator included in the second at least one indicator.

Some examples of the method, apparatuses, and non-transitory computer-readable medium described herein may further include operations, features, means, or instructions for determining a PUCCH resource indicated by a feedback resource indicator of the at least one indicator, identifying QCL information for the PUCCH resource and determining a number of TRPs to which the UE may be to transmit the feedback message based on the QCL information.

Some examples of the method, apparatuses, and non-transitory computer-readable medium described herein may further include operations, features, means, or instructions for determining that a PUCCH transmission including the feedback message may be to be transmitted to a single TRP of the set of TRPs based on the QCL information indicating that the PUCCH resource may have a QCL relationship with a single downlink reference signal and transmit the feedback message in accordance with the QCL information for the PUCCH resource.

Some examples of the method, apparatuses, and non-transitory computer-readable medium described herein may further include operations, features, means, or instructions for determining that PUCCH transmission including the feedback message may be to be transmitted to multiple TRPs of the set of TRPs based on the QCL information indicating that the PUCCH resource may have a QCL relationship with a set of different downlink reference signals.

Some examples of the method, apparatuses, and non-transitory computer-readable medium described herein may further include operations, features, means, or instructions for determining a transmission power for a PUCCH transmission including the feedback message based on a path-loss calculation using a first downlink reference signal of the set of different downlink reference signals that experienced a larger path loss and transmit the PUCCH transmission including the feedback message using the determined transmission power.

Some examples of the method, apparatuses, and non-transitory computer-readable medium described herein may further include operations, features, means, or instructions for determining a scrambling identifier corresponding to a TRP of the set of TRPs based on the at least one indicator and transmitting the feedback message via a PUCCH to the TRP based on the scrambling identifier.

Some examples of the method, apparatuses, and non-transitory computer-readable medium described herein may further include operations, features, means, or instructions for determining a semi-persistent schedule configuration for a PDSCH based on the configuration message and transmitting a PUCCH transmission once per each PDSCH occasion based on the semi-persistent schedule configuration.

Some examples of the method, apparatuses, and non-transitory computer-readable medium described herein may further include operations, features, means, or instructions for determining a semi-persistent schedule configuration for a PDSCH based on the configuration message and transmitting a first PUCCH transmission to a first TRP of the set of TRPs and a second PUCCH transmission to a second TRP of the set of TRPs once per each PDSCH occasion, where the first PUCCH transmission and the second PUCCH transmission include the same feedback message.

In some examples of the method, apparatuses, and non-transitory computer-readable medium described herein, the first PUCCH transmission and the second PUCCH transmission may be transmitted in a same time interval.

In some examples of the method, apparatuses, and non-transitory computer-readable medium described herein, the first PUCCH transmission and the second PUCCH transmission may be transmitted in different time intervals.

In some examples of the method, apparatuses, and non-transitory computer-readable medium described herein, the semi-persistent schedule configuration indicates a first PUCCH resource and a second PUCCH resource per PDSCH occasion and a time offset between the first PUCCH resource and the second PUCCH resource.

In some examples of the method, apparatuses, and non-transitory computer-readable medium described herein, transmitting the feedback message further may include operations, features, means, or instructions for determining, based on the UE operating in a carrier aggregation configuration, that information bits for a set of feedback message including the feedback message may be scheduled to be transmitted in a same time interval, multiplexing or bundling the information bits for the set of feedback message to generate a combined feedback message and transmitting the combined feedback message. In some examples of the method, apparatuses, and non-transitory computer-readable medium described herein, may include operations, features, means, or instructions for determining an ordering of the information bits based at least in part on a component carrier index and an identifier of control resource set of a PDCCH resource used to transmit the DCI that schedules the information bits.

Some examples of the method, apparatuses, and non-transitory computer-readable medium described herein may further include operations, features, means, or instructions for determining that an ordering of the information bits based on a carrier index and an identifier of a PDCCH resource used to transmit the DCI that schedules the information bits.

A method of wireless communication at a base station is described. The method may include transmitting a configuration message for configuring a UE to communicate coordinated transmissions with a set of TRPs using a first coordinated transmission mode of a set of different coordinated transmission modes, transmitting, based on the configuration message, DCI including at least one indicator, and receiving, in accordance with a feedback configuration corresponding to the at least one indicator and the first coordinated transmission mode, a feedback message for a first coordinated transmission.

An apparatus for wireless communication at a base station is described. The apparatus may include a processor, memory in electronic communication with the processor, and instructions stored in the memory. The instructions may be executable by the processor to cause the apparatus to transmit a configuration message for configuring a UE to communicate coordinated transmissions with a set of TRPs using a first coordinated transmission mode of a set of different coordinated transmission modes, transmit, based on the configuration message, DCI including at least one indicator, and receive, in accordance with a feedback configuration corresponding to the at least one indicator and the first coordinated transmission mode, a feedback message for a first coordinated transmission.

Another apparatus for wireless communication at a base station is described. The apparatus may include means for transmitting a configuration message for configuring a UE to communicate coordinated transmissions with a set of TRPs using a first coordinated transmission mode of a set of different coordinated transmission modes, transmitting, based on the configuration message, DCI including at least one indicator, and receiving, in accordance with a feedback configuration corresponding to the at least one indicator and the first coordinated transmission mode, a feedback message for a first coordinated transmission.

A non-transitory computer-readable medium storing code for wireless communication at a base station is described. The code may include instructions executable by a processor to transmit a configuration message for configuring a UE to communicate coordinated transmissions with a set of TRPs using a first coordinated transmission mode of a set of different coordinated transmission modes, transmit, based on the configuration message, DCI including at least one indicator, and receive, in accordance with a feedback configuration corresponding to the at least one indicator and the first coordinated transmission mode, a feedback message for a first coordinated transmission.

In some examples of the method, apparatuses, and non-transitory computer-readable medium described herein, the feedback message may be received from the UE.

In some examples of the method, apparatuses, and non-transitory computer-readable medium described herein, the feedback message may be received from a second base station via a backhaul link.

Some examples of the method, apparatuses, and non-transitory computer-readable medium described herein may further include operations, features, means, or instructions for determining a number of information bits for the feedback indicator and a number of PUCCH transmissions in which the UE may be to transmit the feedback message.

In some examples of the method, apparatuses, and non-transitory computer-readable medium described herein, the at least one indicator includes a DAI indicator, a feedback resource indicator, a feedback gap indicator, or any combination thereof.

Some examples of the method, apparatuses, and non-transitory computer-readable medium described herein may further include operations, features, means, or instructions for transmitting the first coordinated transmission in accordance with the first coordinated transmission mode.

Some examples of the method, apparatuses, and non-transitory computer-readable medium described herein may further include operations, features, means, or instructions for receiving an indication that a second base station transmitted the first coordinated transmission in accordance with the first coordinated transmission mode.

DETAILED DESCRIPTION

Figure 1:
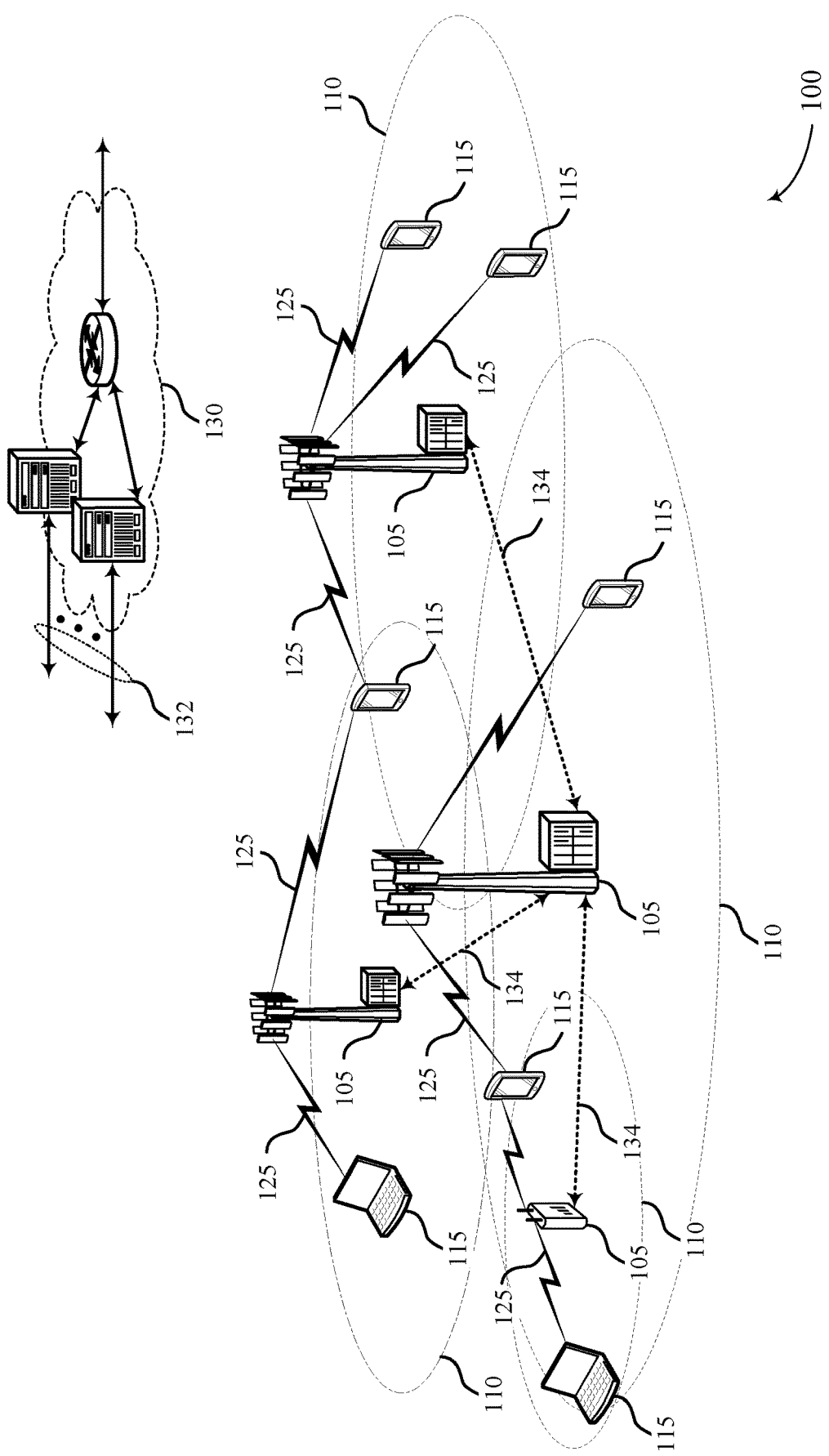
FIGS. 1 through 5 illustrate examples of wireless communications systems that supports feedback design for multi-transmission reception point (multi-TRP) transmission in accordance with aspects of the present disclosure.

The described techniques relate to improved methods, systems, devices, or apparatuses that support feedback design for multi-transmission reception point (multi-TRP) transmission. Generally, the described techniques provide for coordinating communication between a set of transmission reception points (TRPs) and a user equipment (UE) that enables the UE to identify a configuration to use for transmitting feedback to at least one of the TRPs based on downlink control signaling and a coordinated transmission mode in which the UE is configured to operate.

In an example, a first TRP of the set of TRPs may transmit a configuration message for configuring a UE to communicate coordinated transmissions with the set of TRPs using a first coordinated transmission mode of a set of different coordinated transmission modes. Each coordinated transmission mode may indicate a number of uplink and downlink control channels and a number of uplink and downlink data channels configured for communication between a particular TRP and the UE. The first TRP may transmit, based on the configuration message, downlink control information (DCI) that includes at least one indicator and a grant of resources for a downlink coordinated transmission from one of the TRPs to the UE.

In some cases, the DCI may include a downlink assignment index (DAI) indicator, an acknowledgment (ACK) or negative acknowledgment (NACK) (e.g., ACK/NACK) resource indicator (ARI), and a feedback gap indicator (e.g., a K1 value) which corresponds to a time gap between a physical downlink shared channel (PDSCH) message and when the UE is expected to send a corresponding physical uplink control channel (PUCCH) message carrying a feedback message for the PDSCH message. Based on the combination of DAI, ARI, and the feedback gap indicator, the UE may determine a feedback configuration for transmitting a feedback message (e.g., a hybrid automatic repeat request (HARQ) message such as a HARQ-ACK or HARQ-NACK message) within a PUCCH message. The feedback configuration may indicate the number of ACK/NACK bits in the feedback message, the number of PUCCH resources allocated for reporting ACK/NACK feedback, the number of TRPs, to which TRPs the UE is to transmit the feedback message, or any combination thereof.

The UE may monitor the resources indicated in the grant and receive the coordinated transmission communicated in accordance with the configured transmission mode. The UE may determine whether it is able to successfully decode the coordinated transmission, and may transmit, in accordance with the feedback configuration corresponding to the at least one indicator and the first coordinated transmission mode, the feedback message for the coordinated transmission. According to some aspects, the UE may determine the feedback configuration without the TRP having to incur additional signaling overhead of explicitly indicating the feedback configuration to the UE.

Particular aspects of the subject matter described herein may be implemented to realize one or more advantages. The described techniques may support improvements in the ACK/NACK feedback framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects are then described with respect to a quasi co-location (QCL) association configuration and a process flow. Aspects of the disclosure are further illustrated by and described with reference to apparatus diagrams, system diagrams, and flowcharts that relate to feedback design for multi-TRP transmission.

FIG. 1 illustrates an example of a wireless communications system 100 that supports feedback design for multi-TRP transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. A TRP 105 may be an example of a base station 105. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems 100, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as discrete Fourier transform-spread-orthogonal frequency division multiplexing (DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A first TRP (e.g., a base station 105) of a set of TRPs may transmit a configuration message for configuring a UE 115 to communicate coordinated transmissions with the set of TRPs using a first coordinated transmission mode of a set of different coordinated transmission modes. Each coordinated transmission mode may indicate a number of uplink and downlink control channels and a number of uplink and downlink data channels configured for communication between a particular TRP and the UE 115. The first TRP may transmit, based on the configuration message, DCI that includes at least one indicator and a grant of resources for a downlink coordinated transmission from one of the TRPs to the UE 115.

In some cases, the DCI may include a DAI indicator, an ARI, and a feedback gap indicator (e.g., a K1 value). Based on the combination of DAI, ARI, and the feedback gap indicator, the UE 115 may determine a feedback configuration for transmitting a feedback message (e.g., a HARQ-ACK message) within a PUCCH message. The feedback configuration may indicate the number of ACK/NACK bits in the feedback message, the number of PUCCH resources allocated for reporting ACK/NACK feedback, the number of TRPs and to which TRPs the UE 115 is to transmit the feedback message. The UE 115 may monitor the resources indicated in the grant and receive the coordinated transmission communicated in accordance with the configured transmission mode. The UE 115 may determine whether it is able to successfully decode the coordinated transmission, and may transmit, in accordance with the feedback configuration corresponding to the at least one indicator and the first coordinated transmission mode, the feedback message for the coordinated transmission.

Figure 2:
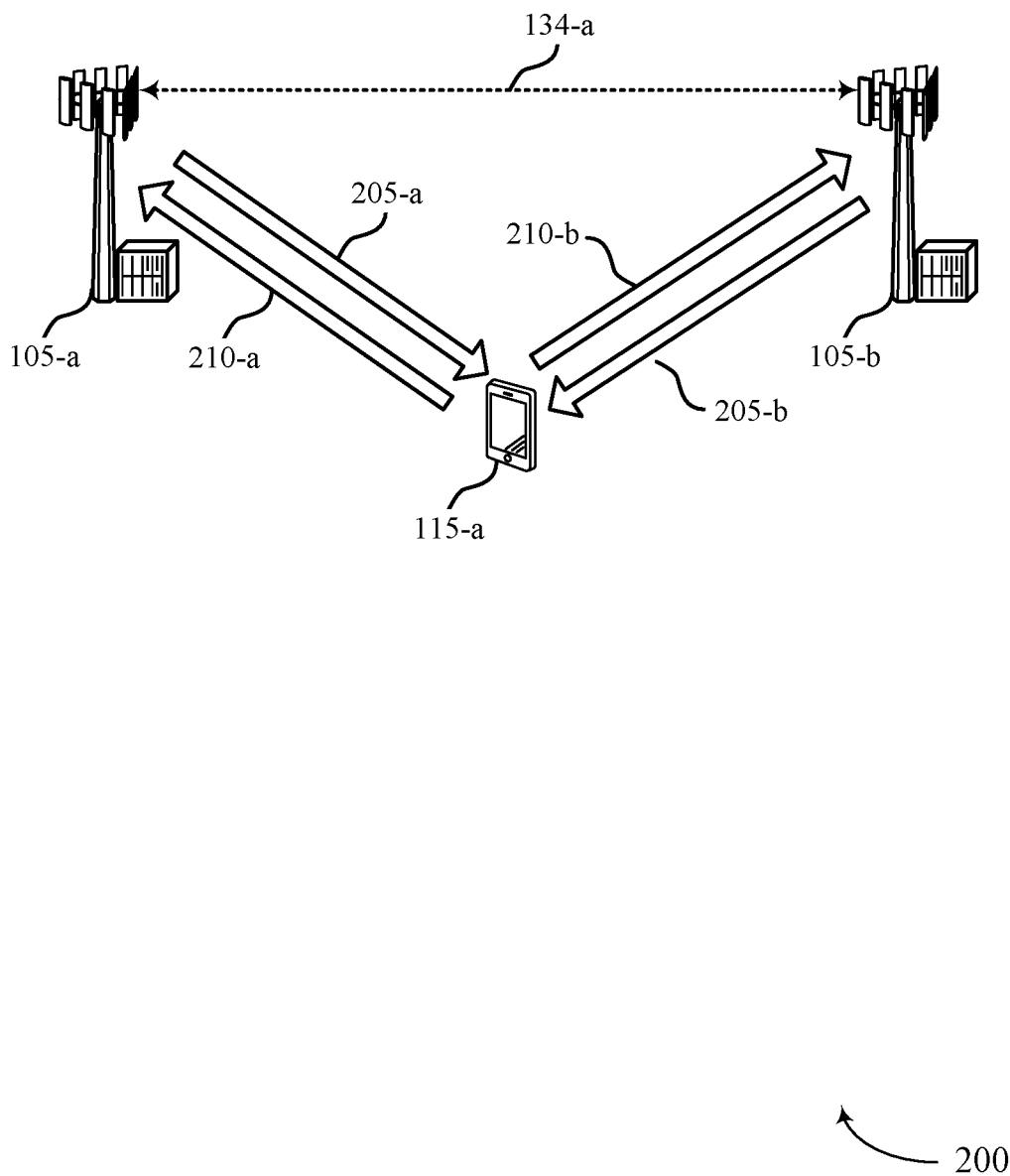

FIG. 2 illustrates an example of a wireless communications system 200 that supports feedback design for multi-TRP transmission in accordance with aspects of the present disclosure. In some examples, wireless communications system 200 may implement aspects of wireless communications system 100.

In wireless communications system 200, multiple TRPs 105, which may be examples of base stations 105 of FIG. 1, may be configured to communicate with a single UE 115, such as UE 115-a. The TRPs 105 may communicate with UE 115-a in a non-coherent manner, for example according to non-coherent joint transmission (NCJT). The TRPs 105 and UE 115-*a* may establish downlink connections 205 (e.g., downlink connection 205-*a* for TRP 105-*a* and downlink connection 205-*b* for TRP 105-*b*) and uplink connections 210 (e.g., uplink connection 210-*a* for TRP 105-*a* and uplink connection 210-*b* for TRP 105-*b*) to communicate. Each TRP 105 may be able to transmit downlink messages (e.g., physical downlink control channel (PDCCH) and PDSCH messages) to UE 115-*a* on a corresponding downlink connection 205, and UE 115-*a* may be able to transmit uplink messages (e.g., PUCCH messages or physical uplink shared channel (PUSCH) messages) on a corresponding uplink connection 210. TRP 105-*a* and TRP 105-*b* may each be an example of a base station 105 as described herein.

TRPs 105-*a* and 105-*b* may communicate with UE 115-*a* according to a transmission mode which is coordinated between the TRPs 105. A transmission mode may refer to a specific configuration for the NCJT wireless communication between UE 115-*a* and the TRPs 105. A transmission mode may relate to a number of PDCCH resources or PDSCH resources used by the TRPs to communicate with UE 115-*a*, as well as the contents or repetition configurations for PDCCH and PDSCH messages. For example, according to a first transmission mode, TRP 105-*a* and TRP 105-*b* may collectively transmit one PDCCH message and one PDSCH message. In another transmission mode, TRP 105-*a* and TRP 105-*b* may collectively transmit one PDSCH message and two PDCCH messages, where the PDCCH messages are duplicates. Examples of transmission modes are illustrated and described in FIGS. 3A through 5.

The TRPs 105 and UE 115-*a* may signal to each other to coordinate the transmission mode. For example, the TRPs 105 may transmit configuration message indicating which transmission mode is being used. In some cases, the configuration message may be transmitted as part of RRC signaling. In some other examples, UE 115-*a* may implicitly determine which transmission mode is being used. In some cases, the implicit determination may be made based on reference signals or information included in DCI. For example, the TRPs 105 may indicate a defined number (e.g., a maximum number) of codewords per PDSCH when configuring the PDSCH resources. Identifying the defined number of codewords per PDSCH may assist UE 115-*a* in determining the multi-TRP transmission modes.

TRP 105-*a* and TRP 105-*b* may have an ideal or near ideal connection (e.g., backhaul link 134-*a*), such that there is zero or approximately zero delay for communications between TRP 105-*a* and TRP 105-*b* when using the backhaul link 134-*a*. Using the backhaul link 134-*a*, in some examples, TRP 105-*a* and TRP 105-*b* may be able to quickly communicate a large amount of data (e.g., nearly instantaneously) with a low level of loss (e.g., nearly lossless). Therefore, the TRPs 105 may be able to coordinate dynamic signaling via the backhaul link 134-*a* without significant overhead or introducing significant latency.

Depending on the configured transmission mode, UE 115-*a* may have multiple configurations for reporting ACK/NACK feedback. In some cases, due to the near ideal backhaul link 134-*a*, a serving TRP 105 may be able to convey ACK/NACK feedback to other TRPs 105 with minimal or no delay. In some cases, different feedback configurations may include different numbers of PUCCH resources allocated for transmitting PUCCH messages which include the ACK/NACK feedback. In some cases, different feedback configurations may include different numbers of bits used to convey the ACK/NACK information. Some feedback configurations may transmit the ACK/NACK feedback to just one TRP 105 (e.g., TRP 105-*a* or TRP 105-*b*), where other feedback configurations may transmit the ACK/NACK feedback to two or more TRPs 105 (e.g., in a broadcast transmission). Therefore, due to the multiple possible configurations for ACK/NACK feedback, UE 115-*a* and the TRPs 105 may implement techniques to establish a framework for ACK/NACK feedback that addresses different transmission modes. Based on the established framework, the TRPs 105 may be able to signal parameters to the UE 115-*a* to enable the UE 115-*a* to determine a feedback configuration for transmitting the ACK/NACK feedback.

TRPs 105 may configure UE 115-*a* with multiple control resource sets for each serving cell per slot. Each serving cell may indicate an active bandwidth part (BWP) of the serving cell, corresponding to frequency resources of the cell which are assigned to UE 115-*a*. UE 115-*a* may monitor for PDCCH messages in one or more PDCCH monitoring occasions.

UE 115-*a* may receive a PDCCH message on a downlink connection 205 during a PDCCH monitoring occasion and select an ACK/NACK feedback option based on indications included in DCI of the PDCCH message. For example, the UE 115-*a* may determine a feedback configuration based on a DAI, an ARI, and a feedback gap indicator (e.g., a K1 value or a PDSCH-to-HARQ timing indicator) which is related to the gap between a PDSCH message and the corresponding ACK/NACK feedback. Based on the combination of DAI, ARI, and K1, UE 115-*a* may determine the number of HARQ ACK/NACK information bits to use and/or the number of PUCCH transmissions to use when reporting ACK/NACK feedback. The TRPs 105 may communicate over the backhaul links 134-*a* to coordinate the DAI/ARI/K1 indications.

In some cases, the TRPs 105 may indicate a defined number (e.g., the max number) of codewords per PDSCH, and the defined number of codewords per PDSCH may correspond to a number of ACK/NACK bits for UE 115-*a* to use. In some cases, indicating the defined number of codewords may assist UE 115-*a* in distinguishing the different transmission modes (e.g., as described in FIGS. 3-6). In some examples, the TRPs 105 may configure UE 115-*a* with the different transmission modes (e.g., by configuring a number of PDSCH and PDCCH resources) by RRC signaling.

UE 115-*a* may also follow a QCL configuration in the PUCCH resource configuration and the ARI in the DCI to determine whether to transmit a PUCCH message containing the ACK/NACK feedback to TRP 105-*a* or TRP 105-*b* or whether to broadcast the PUCCH message to both TRP 105-*a* and TRP 105-*b*. If the PUCCH message is transmitted to just one TRP 105, UE 115-*a* may determine to which TRP 105 to transmit the PUCCH message. In some cases, a PUCCH resource may be configured to be QCLed with a downlink reference signal based on spatial domain parameters. If configured, UE 115-*a* may transmit PUCCH messages using the same spatial domain filters as used for reception of the corresponding downlink reference signal.

If, for example, the PUCCH resource indicated by the ARI is QCL associated with one downlink reference signal, the feedback configuration may indicate that the UE 115-*a* is to transmit PUCCH message containing ACK/NACK feedback to one TRP 105. If the PUCCH resource is QCL associated with two different downlink reference signals with different QCL assumptions, the feedback configuration may indicate that the UE 115-*a* is to transmit PUCCH message to multiple TRPs 105 (e.g., to each of TRP 105-*a* and TRP 105-*b*).

In some cases, UE 115-*a* may be configured with multiple scrambling identifiers (e.g., configured by an information element such as hoppingid), where each scrambling identifier corresponds to one of the multiple TRPs 105. The scrambling identifier may be used by UE 115-*a* to generate a sequence (e.g., a low peak to average power ratio (PAPR) sequence, or a pseudo random sequence) for a PUCCH transmission (e.g., a PUCCH transmission carrying ACK/NACK feedback). The generated sequence may be used as the demodulation reference signal (DMRS) sequence for the PUCCH transmission (e.g., in formats 1, 2, 3, and 4). Additionally or alternatively, the generated sequence may be used to modulate the payload of the PUCCH transmission (e.g., in format 0). Utilizing different PUCCH scrambling identifiers (e.g., or different sequences) for PUCCH transmissions from one or more UEs 115 to TRPs 105-*a* and 105-*b* may reduce interference between the UEs 115 and TRPs 105.

According to some aspects, TRP 105-*a* or TRP 105-*b* may indicate to UE 115-*a* the scrambling identifier for UE 115-*a* to use for a PUCCH transmission. In some implementations, the indication of the scrambling identifier (e.g., by TRP 105-*a* or TRP 105-*b*) may be dynamically signaled in DCI (e.g., using a scrambling identifier indicator in the DCI). Additionally or alternatively, the scrambling identifier may be configured for each PUCCH resource and the UE 115-*a* may determine the scrambling identifier based on the determined PUCCH resource.

In some cases, path-loss computation may follow the downlink reference signal with a larger path loss. That is, if the PUCCH resource is QCLed with two downlink reference signals (e.g., reference signals transmitted by different TRPs), then UE 115-*a* may base a path-loss calculation on the larger path loss between the two downlink reference signal resources. For example, if a first downlink reference signal has a path loss of 120 dB, and a second downlink reference signal has path loss of 125 dB, then UE 115-*a* may determine the path loss to be 125 dB. UE 115-*a* may use the determined path loss to calculate a transmission power for a transmission of a PUCCH message (e.g., to compensate for the path loss). In an example, the UE 115-*a* may use a larger transmission power if a path loss is larger. If the PUCCH message is to be received (e.g., correctly) at the two TRPs 105, then UE 115-*a* compensates for the larger path loss so that the PUCCH message may be received by each of the TRPs 105.

At least one of the TRPs 105 may transmit a configuration message to configure UE 115-*a* with a set of PDCCH monitoring occasions, and the configuration message may indicate each PDCCH monitoring occasion using a search space identifier and a control resource set identifier. In an example, the UE 115-*a* supporting multi-TRP may be configured with multiple control resource sets per serving cell (active BWP) per slot. In some examples, different control resource sets may have different QCL assumptions to account for PDCCH transmissions from different TRPs 105. In some cases, the PDCCH messages may have an order based on the different PDCCH monitoring occasions. As such, an order of PDCCH messages may be based on the identifiers of control resource sets in which the PDCCH messages are received.

In an example, PDCCH message coming from different TRPs 105 may appear in different PDCCH monitoring occasions, and the different PDCCH monitoring occasions may have an order. For example, if two PDCCH messages are received in a same slot, one of the PDCCH messages may be the "first" PDCCH message and the other PDCCH message may be the "second" PDCCH message based on in which of the control resource sets the PDCCH messages are received. The order of the PDCCH messages received in a same slot may not be based on a temporal order of reception and instead may be based on in which PDCCH monitoring occasion a particular PDCCH message is received. For example, the "first" PDCCH message may be received in later occurring symbol periods than the "second" PDCCH message. In some cases, UE 115-*a*, TRP 105-*a*, and TRP 105-*b* may agree on a number of PDCCH messages (e.g., K PDCCH messages) that can be received at UE 115-*a* per serving cell per slot as part of UE capability, which may reduce UE implementation complexity. For example, UE 115-*a* may be configured to receive at most two PDCCH messages per serving cell per slot.

Figure 3A:
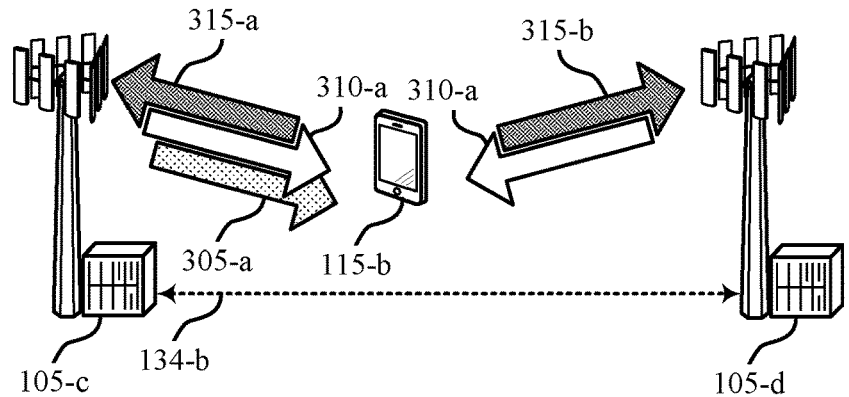
Figure 3B:
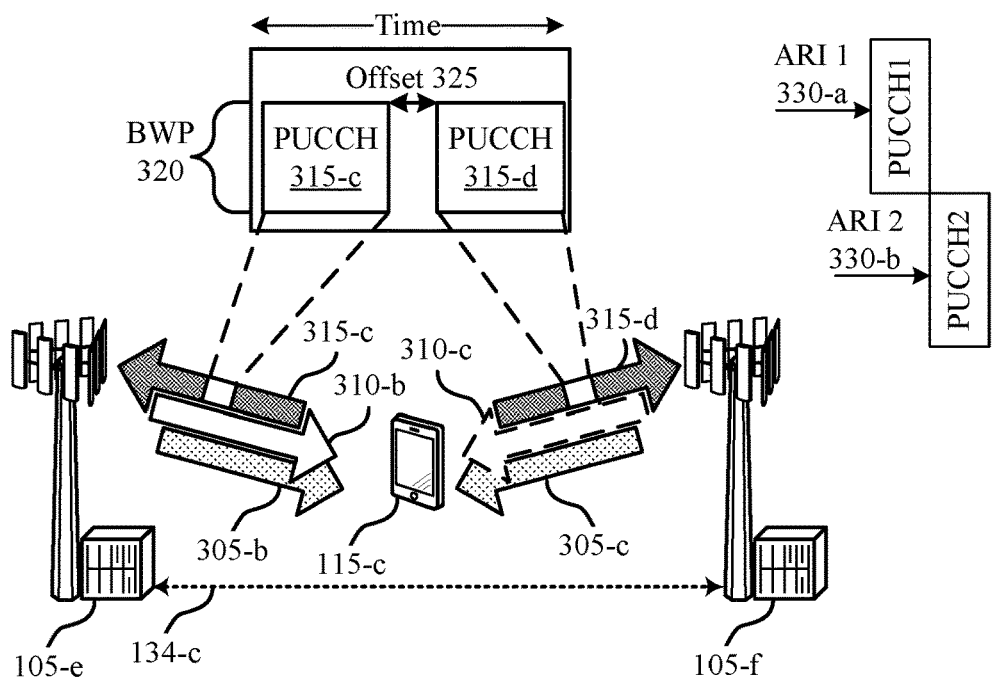
Figure 3B:
Figure 3B:
Figure 3B:

FIGS. 3A and 3B illustrate respective examples of wireless communications systems 300 and 301 that support feedback design for multi-TRP transmission in accordance with aspects of the present disclosure. In some examples, the wireless communications systems 300 and 301 may implement aspects of wireless communications systems 100 or 200.

Wireless communications system 300 may support a first transmission mode for NCJT communications between UE 115-*b*, TRP 105-*c*, and TRP 105-*d*. In the first transmission mode, the TRPs 105 may collectively transmit one PDCCH message and one PDSCH message (e.g., Mode 1: 1 PDCCH+1 PDSCH). For example, TRP 105-*c* may transmit the PDCCH message 305-*a* to UE 115-*b*. TRP 105-*c* may transmit PDSCH message 310-*a* on a first spatially multiplexed layer, and TRP 105-*d* may transmit the PDSCH message 310-*a* on a second spatially multiplexed layer.

Wireless communications system 301 may support a second transmission mode for NCJT communications between UE 115-*c*, TRP 105-*e*, and TRP 105-*f*. In the second transmission mode, the TRPs 105 may collectively transmit two PDCCH messages 305 and one PDSCH message 310 (e.g., Mode 2: 2 PDCCH+1 PDSCH). For example, TRP 105-*e* may transmit PDCCH message 305-*b* to UE 115-*c*, and TRP 105-*f* may transmit PDCCH message 305-*c* to UE 115-*c*. The second transmission mode may include PDCCH repetition. For example, PDCCH message 305-*b* and PDCCH message 305-*c* may be duplicates or copies of each other. Transmitting PDCCH duplicates may make the PDCCH transmission more robust and improve the chances of UE 115-*c* successfully receiving at least one copy of the PDCCH message 305. In the second transmission mode, either TRP 105-*e* or TRP 105-*f* may transmit the PDSCH message 310. In some cases, TRP 105-*e* may transmit PDSCH message 310-*b* to UE 115-*c*. Or, in other examples, TRP 105-*d* may transmit PDSCH message 310-*c* to UE 115-*c*.

In the first and second transmission modes, the PDCCH message 305, which is repeated in the second transmission mode, may indicate a DAI/ARI/K1 for reporting ACK/NACK feedback. The DAI/ARI/K1 may be included in DCI of the PDCCH message 305. One PDSCH message 310 may be transmitted per slot per CC, therefore the number of ACK/NACK bits for UE 115-*b* and UE 115-*c* to use in reporting feedback may be equal to a defined number (e.g., the maximum number) of codewords scheduled by DCI per PDSCH, or the number of codewords in the PDSCH message 310. In some cases, the defined number of codewords scheduled per PDSCH may be indicated by an indicator (e.g., an information element such as maxNrofCodeWordsScheduledByDC7).

The UEs 115 and TRPs 105 may implement techniques to coordinate a configuration for the UEs 115 to report feedback for the PDSCH messages 310 based on the transmission mode and DCI included in the PDCCH message 305. In some cases, to improve reliability, the TRPs 105 may schedule two PUCCH transmissions for the same ACK/NACK bits. For example, in the first transmission mode, UE 115-b may transmit a PUCCH message 315-a to TRP 105-c and a PUCCH message 315-b to TRP 105-d. In some cases, the PUCCH message 315-a and PUCCH message 315-b may include the same ACK/NACK bits. In the second transmission mode, UE 115-c may transmit a PUCCH message 315-c to TRP 105-e and a PUCCH message 315-d to TRP 105-f. Similarly, the PUCCH message 315-c and the PUCCH message 315-d may include the same ACK/NACK bits.

In a first example, the PDCCH message 305 may include DCI containing two ARI fields (e.g., ARI field 330-a and ARI field 330-b) which point to two PUCCH resources within the same slot. Therefore, UE 115-b may transmit a PUCCH message 315-a to TRP 105-c on a first PUCCH resource and transmit a PUCCH message 315-b to TRP 105-d on a second PUCCH resource, the PUCCH messages 315 may be transmitted in the same slot. Similarly, UE 115-c may transmit a PUCCH message 315-c to TRP 105-e on a first PUCCH resource and transmit a PUCCH message 315-d to TRP 105-f on a second PUCCH resource within the same slot. In some cases, the two PUCCH messages 315 may be transmitted within a different TTI, such as a mini-slot.

In a second example, by configuration, one PUCCH resource may include two resources (e.g., time domain resources, frequency domain resources, -code domain resources, or any combination thereof) with different QCL information. For example, the different QCL information may indicate different transmit/receive beam directions. In some cases, a first transmit/receive beam may point to a first TRP 105 (e.g., TRP 105-c or TRP 105-e) and a second transmit/receive beam may point to a second TRP 105 (e.g., TRP 105-d or TRP 105-f, respectively). UE 115-c may transmit PUCCH messages 315 containing the ACK/NACK feedback on both of the time-frequency-code domain resources. For example, UE 115-c may transmit PUCCH message 315 on a first time-frequency-code domain resource based on a first QCL association and on a second time-frequency-code domain resource based on a second QCL association. In some cases, DCI in the PDCCH messages 305 may use one DAI and one K1 field to indicate the two time-frequency-code domain resources.

In a third example, an ARI in the DCI may point to two separate PUCCH resources in which the UE 115 is to transmit a PUCCH message including a feedback message. For example, ARI=k may point to PUCCH resources 2k and 2k+1. In some cases, RRC signaling may configure the UE 115 to have the ARI point to two separate PUCCH resources.

In some cases, PDSCH messages 310 may be scheduled semi-persistently (e.g., via semi-persistent scheduling (SPS)). For example, one PDSCH message may be transmitted per slot per downlink SPS configuration. In some cases, the PDSCH message may be transmitted from different TRPs 105, such as the TRPs 105 shown in the wireless communications system 300 implementing the first transmission mode (e.g., Mode 1) or the wireless communications system 301 implementing the second transmission mode (e.g., Mode 2). In some examples under the SPS configuration, the TRPs 105 may configure the UE 115 to transmit one PUCCH message 315 per PDSCH message 310.

In other examples under the SPS configuration, the TRPs 105 may configure the UE 115 to transmit two PUCCH messages 315 per PDSCH message 310, where each PUCCH message 315 is targeted toward one TRP 105. For example, UE 115-c may transmit PUCCH message 315-c to TRP 105-e and PUCCH message 315-d to TRP 105-f as feedback for an SPS PDSCH message (e.g., PDSCH message 310-a or 310-b).

In a first example under the SPS configuration, the PUCCH messages 315 may be transmitted in the same slot. For example, the PUCCH messages 315 may be TDMed within the slot. The TRPs 105 may configure two PUCCH resources in one SPS configuration. In some cases, the K1 value and the PUCCH resources may be signaled in the SPS-activating DCI.

In a second example under the SPS configuration, the PUCCH messages 315 may be transmitted in different slots. The TRPs 105 may configure two PUCCH resources in one SPS configuration. The TRPs 105 may also configure a time-domain offset 325 of the second PUCCH resource with respect to the first PUCCH resource (e.g., in the unit of number of slots). For example, as shown, the time-domain offset 325 separates PUCCH message 315-c from PUCCH message 315-d in the time-domain. The PUCCH message 315-c and PUCCH message 315-d may be transmitted in a same BWP 320. In some cases, the time-domain offset 325 is referred to as $\Delta_k$. The SPS-activating DCI may signal a K1 for the first PUCCH message (e.g., PUCCH message 315-c), and the actual K1 value for the second PUCCH message (e.g., PUCCH message 315-d) may be the value of the time-domain offset 325 in addition to K1 (e.g., $\Delta_k$+K1).

Figure 4:
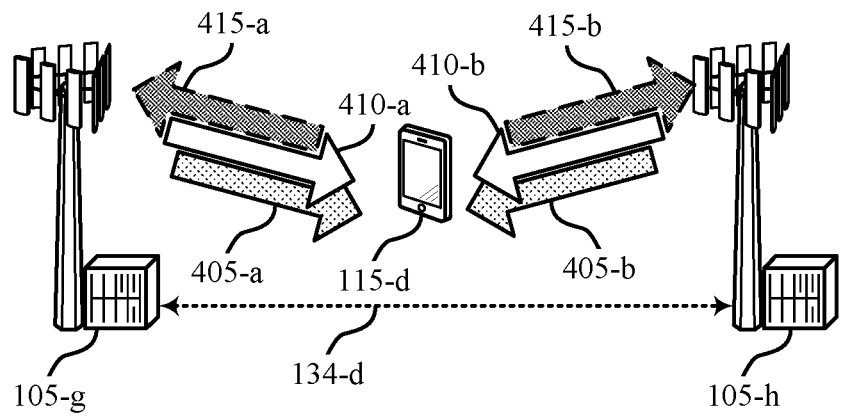
Figure 4:
Figure 4:
Figure 4:

FIG. 4 illustrates an example of a wireless communications system 400 that supports feedback design for multi-TRP transmission in accordance with aspects of the present disclosure. In some examples, wireless communications system 400 may implement aspects of wireless communications systems 100, 200, 300, or 301 for communications between UE 115-d, TRP 105-g, and TRP 105-h.

In the third transmission mode, as illustrated in FIG. 4, the TRPs 105 may collectively transmit two PDCCH messages 405 and two PDSCH messages 410 (e.g., Mode 3: 2 PDCCH+2 PDSCH (Same codeword)). The PDCCH messages 405 may schedule the PDSCH messages 410, and the two PDSCH messages 410 (e.g., PDSCH message 410-a and PDSCH message 410-b) may include the same set of at least one codeword. Each codeword may correspond to one transport block generated at a higher layer (e.g., the MAC layer) at the TRP 105. For example, PDCCH message 405-a may schedule PDSCH message 410-a, and PDCCH message 405-b may schedule PDSCH message 410-b. The third transmission mode may be an example of PDSCH repetition.

As shown, TRP 105-g may transmit PDCCH message 405-a to UE 115-d, and TRP 105-h may transmit PDCCH message 405-b to UE 115-d. In some examples, PDCCH message 405-a and PDCCH message 405-b may be transmitted in the same slot to UE 115-d. The PDCCH messages 405 may schedule a corresponding PDSCH message 410 from the TRP 105. TRP 105-g may transmit PDSCH message 410-a to UE 115-d, and TRP 105-h may transmit PDSCH message 410-b to UE 115-d, where PDSCH message 410-a and PDSCH message 410-b carry the same set of at least one codeword. The PDSCH messages 410 may also include a same set of at least one feedback process identifier (e.g., have a same HARQ process identifier). Each of the set of at least one feedback process identifier corresponds to one codeword in the at least one codeword. In some examples, the PDSCH messages 410 may have different resource allocations, modulation coding scheme (MCS) configurations, or redundancy versions, for example to adapt to the different channel condition between the different TRPs 105 and the UE 115.

In a first example of an ACK/NACK feedback configuration under the third transmission mode, PDCCH message 405-a and PDCCH message 405-b may include the same K1 value and same ARI. If the PDCCH messages include the same K1 and ARI parameters, UE 115-d may transmit one PUCCH message 415. For example, UE 115-d may transmit either PUCCH message 415-a to TRP 105-g or transmit PUCCH message 415-b to TRP 105-h or transmit the same PUCCH message 415 to both TRP 105-g and TRP 105-h. The number of ACK/NACK bits included in the PUCCH message 415 may be equal to a defined number (e.g., a threshold number, a maximum number) of codewords scheduled by DCI. For example, the number of ACK/NACK bits may be based on the number of codewords which are duplicated in PDSCH message 410-a and 410-b.

In a second example of an ACK/NACK feedback configuration under the third transmission mode, the PDCCH messages 405 may include either a different K1 or a different ARI. In the second example, UE 115-d may transmit two PUCCH messages 415. Each PUCCH message 415 may follow the K1 and ARI received in a corresponding DCI for PUCCH transmission.

There may be differences in how UE 115-d reports feedback based on whether the K1 is different or the ARI is different. If the K1 is the same but the ARI is different, UE 115-d may implement PUCCH repetition. For example, PUCCH message 415-a to TRP 105-g and PUCCH message 415-b to TRP 105-h may be the same PUCCH message 415. If the K1 is different, two different PUCCH messages 415 may be transmitted (e.g., having different ACK/NACK payload) due to ACK/NACK multiplexing and/or bundling across slots and across CCs.

For example, UE 115-d may determine to multiplex or bundle HARQ-ACK information bits corresponding to multiple PDSCH messages 410 for transmission in a single PUCCH message 415, and the determination may be based on where the K1 in two PDCCH messages 405 are the same. Multiplexing may refer to combining feedback for multiple PDSCH messages 410 for sending in a single PUCCH message 415. For example, if a UE 115-d determines a NACK for a first PDSCH message 410-a and an ACK for second PDSCH message 410-b, UE 115-d may transmit a 2-bit sequence indicating a NACK and an ACK (e.g., '01' where 0 indicates NACK and 1 indicates ACK) to the TRP 105. Bundling may refer to the UE 115-d performing a logical AND operation on two HARQ-ACK information bits, and transmitting 1 bit to one or more TRPs 105. For example, if UE 115-d determines a NACK for a first PDSCH message 410-a and an ACK for second PDSCH message 410-b, then UE 115-d may transmit 1 bit NACK (e.g., (NACK) AND (ACK)=NACK) to the TRP 105. The TRP 105 may provide a configuration message to configure whether the UE 115-d performs multiplexing or bundling. UE 115-d may determine whether to perform multiplexing or bundling based on a configuration message received from the TRP 105 containing this information.

In some examples, for any of the transmission modes described herein, UE 115-d may multiplex the HARQ-ACK information bits corresponding to other PDSCH messages 410 received in another slot or component carrier with the current HARQ-ACK information bits, if the PDCCH messages 405 that schedule these PDSCH messages 410 indicate that corresponding HARQ-ACK bits are going to be transmitted in the same slot. For example, the techniques described herein may be applied for carrier aggregation when used in combination with multi-TRP transmission.

In the third transmission mode (e.g., Mode 3), if UE 115-d successfully decodes one PDSCH message 410-a, UE 115-d may skip decoding the other PDSCH message 410-b (or vice versa) because each PDSCH message 410 includes the same codeword. However, UE 115-d may still transmit two PUCCH messages 415 if the two PDCCH messages 405 indicate different values for K1 or ARI.

Figure 5:
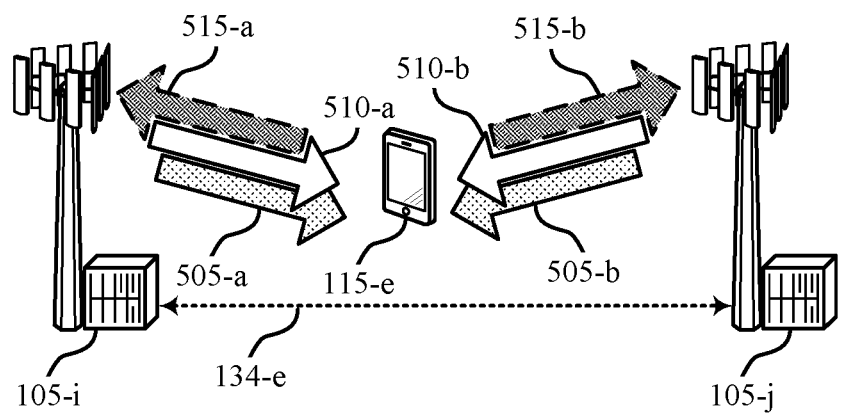

FIG. 5 illustrates an example of a wireless communications system 500 that supports feedback design for multi-TRP transmission in accordance with aspects of the present disclosure. In some examples, wireless communications system 500 may implement aspects of wireless communications systems 100, 200, 300, 301, or 400.

Wireless communications system 500 may support a fourth transmission mode for NCJT communications between UE 115-e, TRP 105-i, and TRP 105-j. In the fourth transmission mode, the TRPs 105 may collectively transmit two PDCCH messages 505 and two PDSCH messages 510 (e.g., Mode 4: 2 PDCCH+2 PDSCH (different codewords)). The PDCCH messages 505 may schedule the PDSCH messages 510. For example, PDCCH message 505-a may schedule PDSCH message 510-a, and PDCCH message 505-b may schedule PDSCH message 510-b. In the fourth transmission mode, the two PDSCH messages 510 (e.g., PDSCH message 510-a and PDSCH message 510-b) may include different codewords and HARQ process identifiers. Each codeword corresponds to one transport block generated at the higher layer (e.g., the MAC layer) at the base station, and one HARQ process identifier.

As shown, TRP 105-i may transmit PDCCH message 505-a to UE 115-e, and TRP 105-j may transmit PDCCH message 505-b to UE 115-e. TRP 105-i may transmit PDSCH message 510-a to UE 115-e, and TRP 105-j may transmit PDSCH message 510-b to UE 115-e, where PDSCH message 510-a and PDSCH message 510-b carry different codewords with different HARQ process identifiers.

In a first example of an ACK/NACK feedback configuration under the fourth transmission mode, PDCCH message 505-a and PDCCH message 505-b may indicate the same K1 value. If the K1 values are the same, UE 115-e may transmit one PUCCH message, where the number of ACK/NACK bits correspond to the total number of codewords scheduled by both PDCCH message 505-a and PDCCH message 505-b. For example, UE 115-e may transmit PUCCH message 515-a to TRP 105-i, or UE 115-e may transmit PUCCH message 515-b to TRP 105-j, or UE 115-e may transmit one PUCCH message 515 to both TRP 105-i and TRP 105-j. In this first example, UE 115-e may use the DAI and ARI that corresponds to the last PDCCH monitoring occasion for PUCCH transmission and ACK/NACK multiplexing. The last PDCCH monitoring occasion may be based on the control resource set identifier of the PDCCH monitoring occasion as described in FIG. 2. In some examples, to determine the last PDCCH monitoring occasion, a configuration message transmitted by the TRP 105-i configuration may define an ordering of the PDCCH monitoring occasions received within one slot and one cell, where the PDCCH message transmitted within the PDCCH monitoring occasions may be transmitted by different TRPs 105.

UE 115-e may bundle or multiplex the ACK/NACK feedback results based on whether the feedback gap indicators (e.g., K1 or the PDSCH-to-HARQ timing indicator) in PDCCH message 505-a and PDCCH message 505-b are the same. For example, if UE 115-e determined NACK for PDSCH message 510-a and ACK for PDSCH message 510-b, UE 115-e may report "NACK,ACK" (e.g., two bits) in the PUCCH message 515 to the TRPs 105 in case of ACK-NACK multiplexing. Additionally, or alternatively, UE 115-e may take the logical AND operation of the HARQ feedback results and transmit one bit to the TRP 105 in case of ACK-NACK bundling. For example, if PDSCH message 510-a were NACK and PDSCH message 510-b were ACK, UE 115-e would report NACK (e.g., (NACK) AND (ACK) =NACK) to the TRPs 105. The UE determines whether an ACK/NACK multiplexing should be performed or an ACK/NACK bundling should be performed based on the RRC configuration message UE 115-e received from the TRPs 105.

In a second example of an ACK/NACK feedback configuration under the fourth transmission mode, PDCCH message 505-a and PDCCH message 505-b may indicate different K1 values. If the K1 values are different, UE 115-e may transmit two PUCCH messages 515. For this second example, the number of ACK/NACK bits in each PUCCH message 515 may be based on the number of codewords scheduled by a corresponding PDCCH message 505. Each PUCCH message 515 may follow the DAI and ARI received in a corresponding PDCCH message 505 for transmission and ACK/NACK multiplexing.

In some cases, for the fourth transmission mode, the TRPs 105 may configure a parameter corresponding to the maximum number of codewords scheduled by one DCI (e.g., maxNrofCodeWordsScheduledByDCI) to be equal to '1' to reduce the UE detection complexity. For example, if UE 115-e detects that this parameter has a value of '1,' UE 115-e may determine the wireless communications system 500 is operating under the fourth transmission mode. In some cases, each PDSCH message 510 may include one codeword. For example, if two PDSCH messages 510 are scheduled within one slot, then each PDSCH message 510 may contain one codeword, or the DCI included in the PDCCH messages 505 may schedule one codeword.

Figure 6:
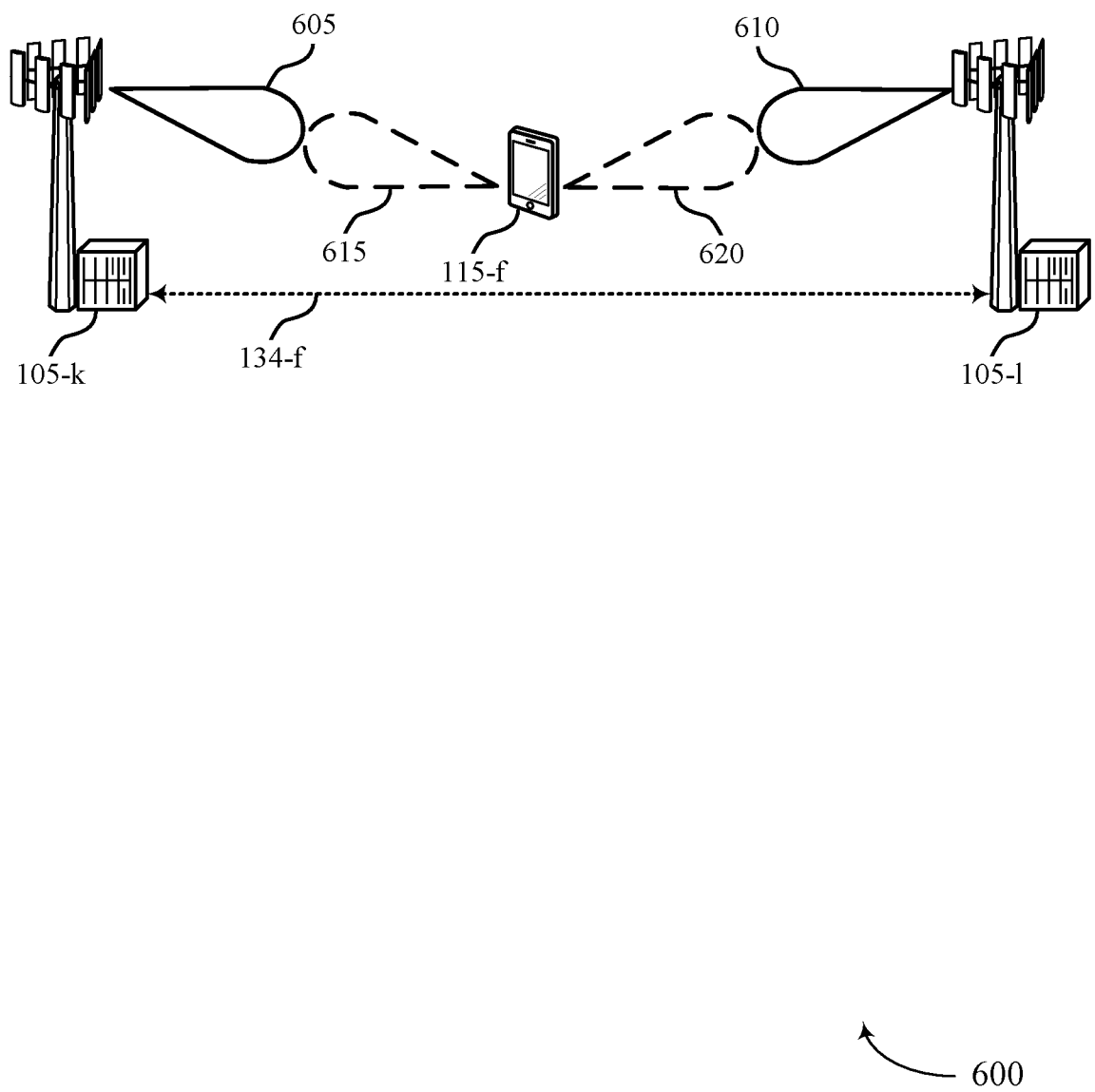
FIG. 6 illustrates an example of a quasi co-location (QCL) association configuration that supports feedback design for multi-TRP transmission in accordance with aspects of the present disclosure.

FIG. 6 illustrates an example of a QCL association configuration 600 that supports feedback design for multi-TRP transmission in accordance with aspects of the present disclosure. In some examples, QCL association configuration 600 may implement aspects of wireless communications systems 100, 200, 300, 301, 400, or 500.

PUCCH resources may be configured to be QCL associated with a downlink reference signal based on spatial domain parameters. For example, if configured, UE 115-f may transmit a PUCCH message using the same spatial domain filters as used for a reception of a corresponding, QCL-associated downlink reference signal. In some cases, a PUCCH resource may be configured to be QCL associated with one downlink reference signal. The QCL association may be based on a parameter PUCCH-SpatialRelationInfo. In some other examples, a PUCCH resource may be QCL associated with two different downlink reference signals with different QCL assumptions, where each downlink reference signal is transmitted from one different TRP.

UE 115-f may follow the QCL configuration in the PUCCH resource configuration and ARI to determine whether a PUCCH message is transmitted to either TRP 105-k or TRP 105-l, or whether the PUCCH message is broadcasted to both TRP 105-k and TRP 105-l. In some cases, techniques described for the QCL association configuration 600 may be applied to the transmission modes described herein.

In a first example, the PUCCH resource indicated by ARI is QCL associated with one downlink reference signal, and hence UE 115-f may transmit a PUCCH message to a single TRP 105. For example, the PUCCH resource may be QCL associated with a downlink reference signal transmitted by TRP 105-k on beam 605, or the PUCCH resource may be QCL associated with a downlink reference signal transmitted by TRP 105-l on beam 610. UE 115-f may transmit the PUCCH message on either beam 615, which corresponds to beam 605 and the downlink reference signal from TRP 105-k, or UE 115-f may transmit the PUCCH message on beam 620, which corresponds to beam 610 and the downlink reference signal from TRP 105-l.

In a second example, the PUCCH resource indicated by ARI may be QCL associated with two different downlink reference signals with different QCL assumptions, and hence UE 115-f may infer that it is to transmit the PUCCH message to multiple TRPs. In the second example, UE 115-f may transmit the PUCCH message simultaneously to both TRPs 105. In this example, the path loss computation may follow the downlink reference signal with a larger path loss. Based on using the larger path loss, UE 115-f may transmit the PUCCH using a larger transmission power compared to the transmission power that would be used for the smaller path loss so that the PUCCH message may be correctly received by each of the TRPs.

In some cases, UE 115-f may be configured with multiple scrambling identifiers (e.g., configured by an information element such as hoppingid), where each scrambling identifier corresponds to one of the multiple TRPs 105. The scrambling identifier may be used by UE 115-f to generate a sequence (e.g., a low PAPR sequence, or a pseudo random sequence) for a PUCCH transmission (e.g., a PUCCH transmission carrying ACK/NACK feedback). The generated sequence may be used as the DMRS sequence for the PUCCH transmission (e.g., in formats 1, 2, 3, and 4). Additionally or alternatively, the generated sequence may be used to modulate the payload of the PUCCH transmission (e.g., in format 0). Utilizing different PUCCH scrambling identifiers (e.g., or different sequences) for PUCCH transmissions from one or more UEs 115 to TRPs 105-k and 105-l may reduce interference between the UEs 115 and TRPs 105.

According to some aspects, TRP 105-k or TRP 105-l may indicate to UE 115-f the scrambling identifier for UE 115-f to use for a PUCCH transmission. In some implementations, the indication of the scrambling identifier (e.g., by TRP 105-k or TRP 105-l) may be dynamically signaled in DCI (e.g., using a scrambling identifier indicator in the DCI). Additionally or alternatively, the scrambling identifier may be configured for each PUCCH resource and the UE 115-f may determine the scrambling identifier based on the determined PUCCH resource.

Figure 7:
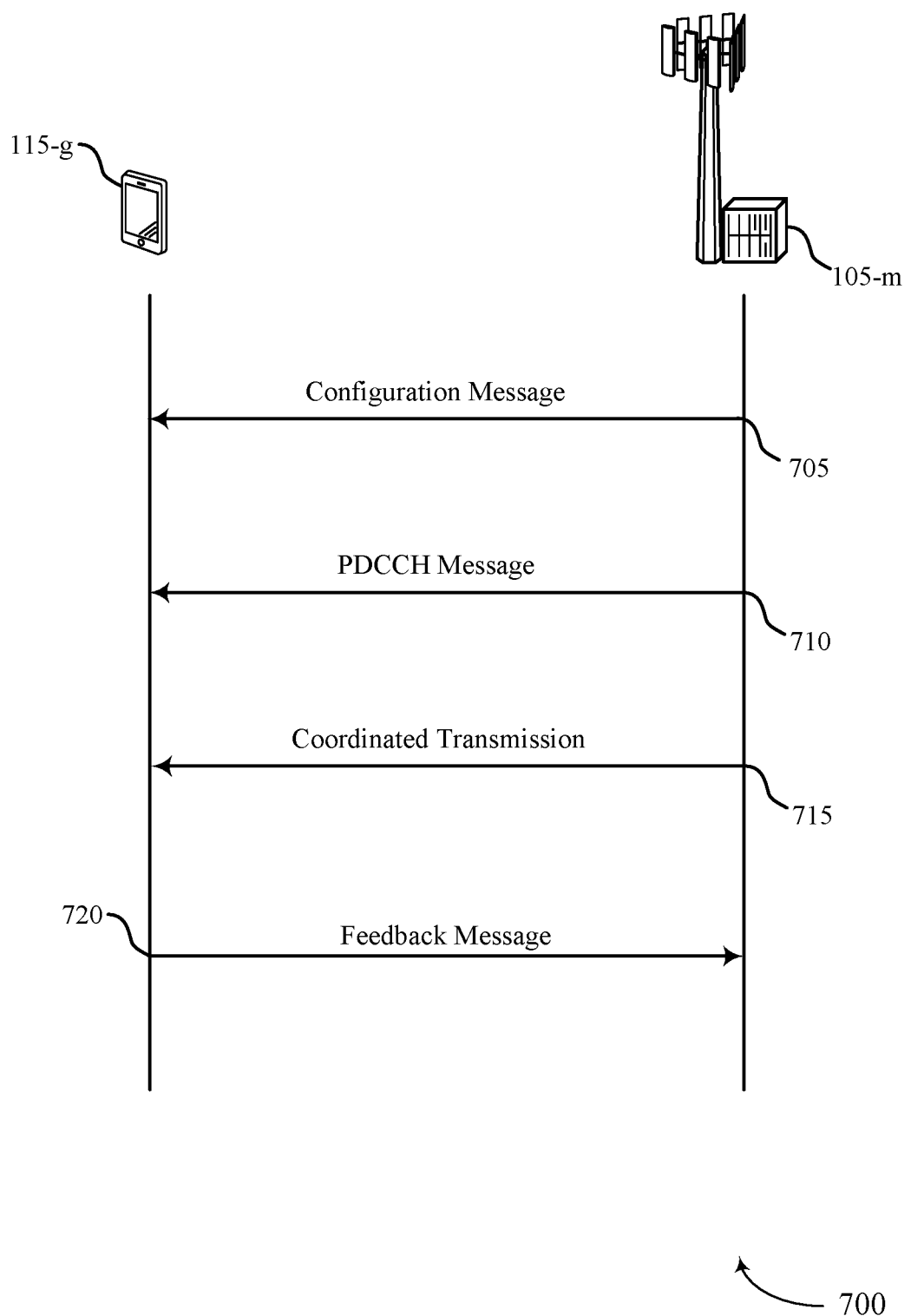
FIG. 7 illustrates an example of a process flow that supports feedback design for multi-TRP transmission in accordance with aspects of the present disclosure.

FIG. 7 illustrates an example of a process flow 700 that supports feedback design for multi-TRP transmission in accordance with aspects of the present disclosure. In some examples, process flow 700 may implement aspects of wireless communications systems 100, 200, 300, 301, 400, 500, or 600.

At 705, UE 115-g may receive a configuration message, transmitted by TRP 105-m, configuring UE 115-g to communicate coordinated transmissions with multiple TRPs 105 using a first coordinated transmission mode of a set of different coordinated transmission modes. For example, the set of different coordinated transmission modes may include the first through fourth transmission modes described in FIGS. 3A, 3B, 4, and 5.

At 710, UE 115-g may receive, based on the configuration message, DCI including at least one indicator from TRP 105-m. The DCI may be transmitted in a PDCCH message. The at least one indicator may include, for example, a DAI, a feedback resource indicator, a feedback gap indicator, or any combination thereof.

At 715, UE 115-g may receive a first coordinated transmission communicated in accordance with the first coordinated transmission mode. In some cases, the first coordinated transmission may be transmitted as a PDSCH message. In some cases, the TRP 105-m, of the set of TRPs, which transmits the first coordinated message may be determined based on the coordinated transmission mode.

At 720, UE 115-g may transmit, in accordance with a feedback configuration corresponding to the at least one indicator and the first coordinated transmission mode, a feedback message for the first coordinated transmission to at least one TRP 105-m of the set of TRPs. For example, if TRP 105-m is connected to another TRP 105 via an ideal backhaul link, UE 115-g may in some cases transmit the feedback message to the other TRP 105, and the other TRP 105 may convey the feedback message to TRP 105-m via the ideal backhaul link.

Figure 8:
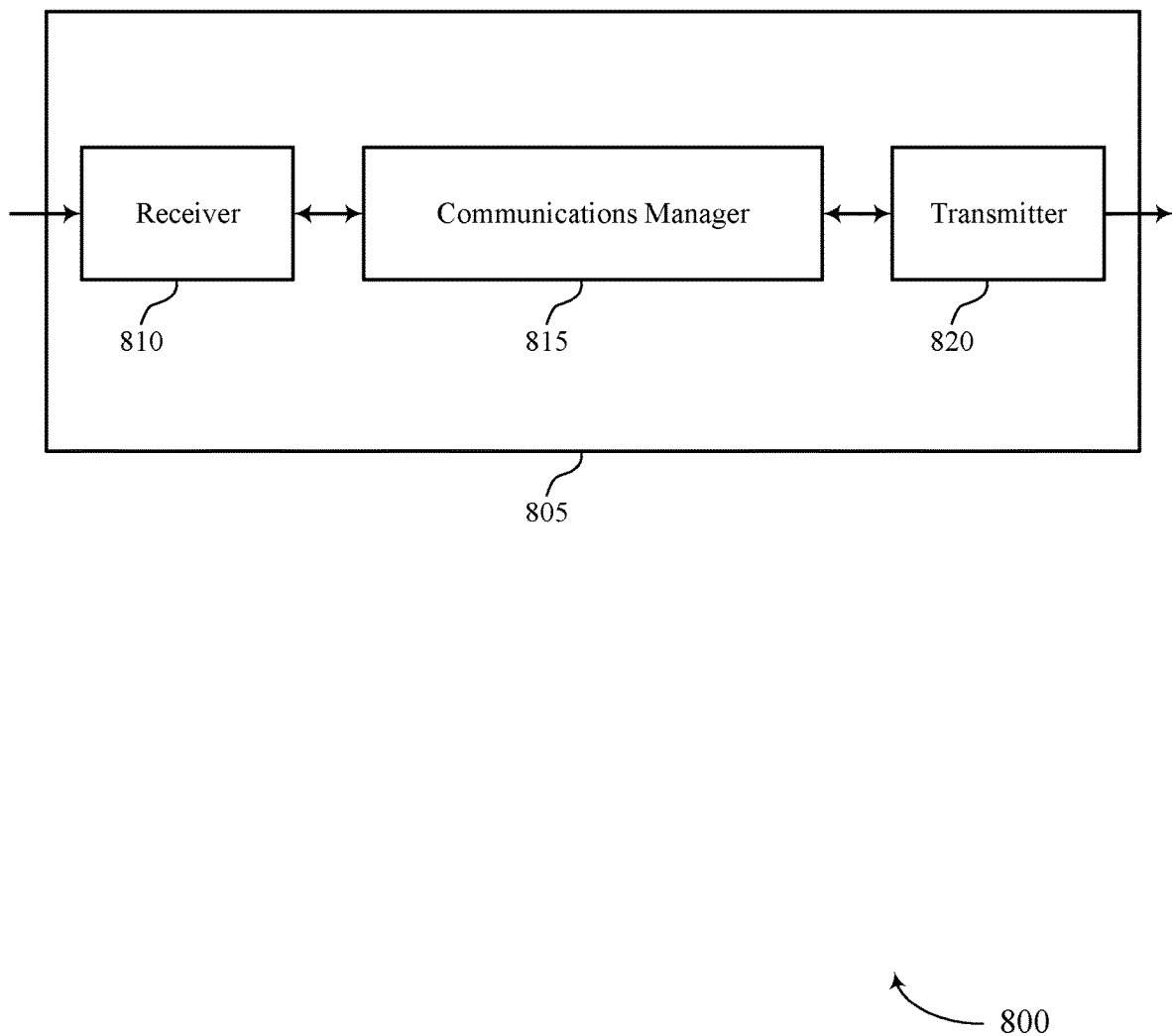
FIGS. 8 and 9 show block diagrams of devices that support feedback design for multi-TRP transmission in accordance with aspects of the present disclosure.

FIG. 8 shows a block diagram 800 of a device 805 that supports feedback design for multi-TRP transmission in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to feedback design for multi-TRP transmission). Information may be passed on to other components of the device 805. The receiver 810 may be an example of aspects of the transceiver 1120 described with reference to FIG. 11. The receiver 810 may utilize a single antenna or multiple antennas.

The communications manager 815 may receive a configuration message configuring the UE to communicate coordinated transmissions with a set of TRPs using a first coordinated transmission mode of a set of different coordinated transmission modes, receive, based on the configuration message, DCI including at least one indicator, receive a first coordinated transmission communicated in accordance with the first coordinated transmission mode, and transmit, in accordance with a feedback configuration corresponding to the at least one indicator and the first coordinated transmission mode, a feedback message for the first coordinated transmission to at least one of the set of TRPs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or multiple antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may allow the device 805 to more efficiently coordinate communication between a set of TRPs and the device 805, and more specifically to coordinate feedback communication from the device 805 to one or more TRPs. For example, the device 805 may identify a configuration to use for transmitting feedback to a TRP, based on received downlink control signaling and a coordinated transmission mode.

Figure 11:
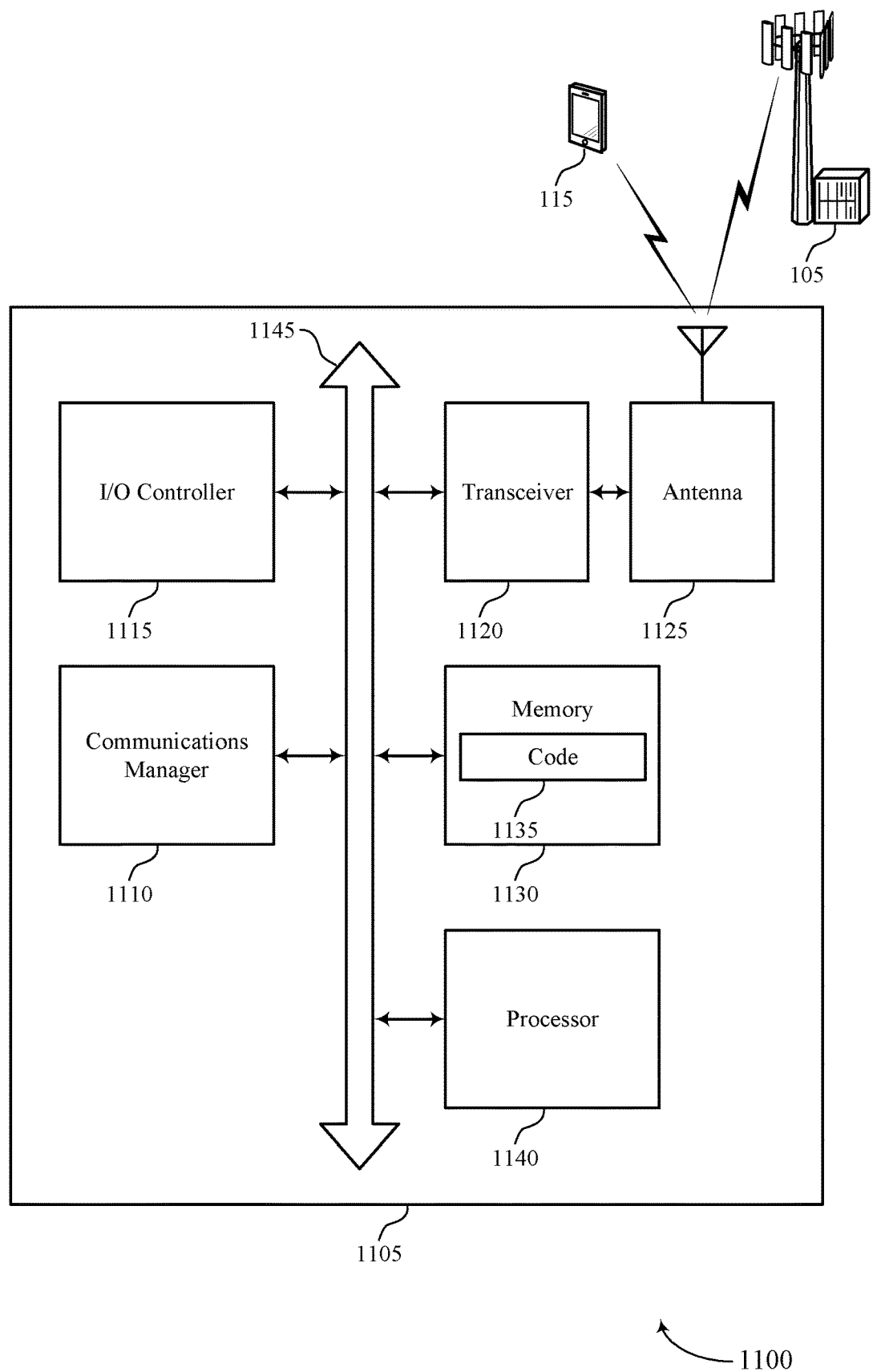
FIG. 11 shows a diagram of a system including a device that supports feedback design for multi-TRP transmission in accordance with aspects of the present disclosure.

Based on implementing the feedback mechanism techniques as described herein, a processor of a UE 115 (e.g., controlling the receiver 810, the transmitter 820, or the transceiver 1120 as described with reference to FIG. 11) may increase reliability and decrease signaling overhead in the communication of feedback because the feedback configuration may not be explicitly indicated to the UE 115.

Figure 9:
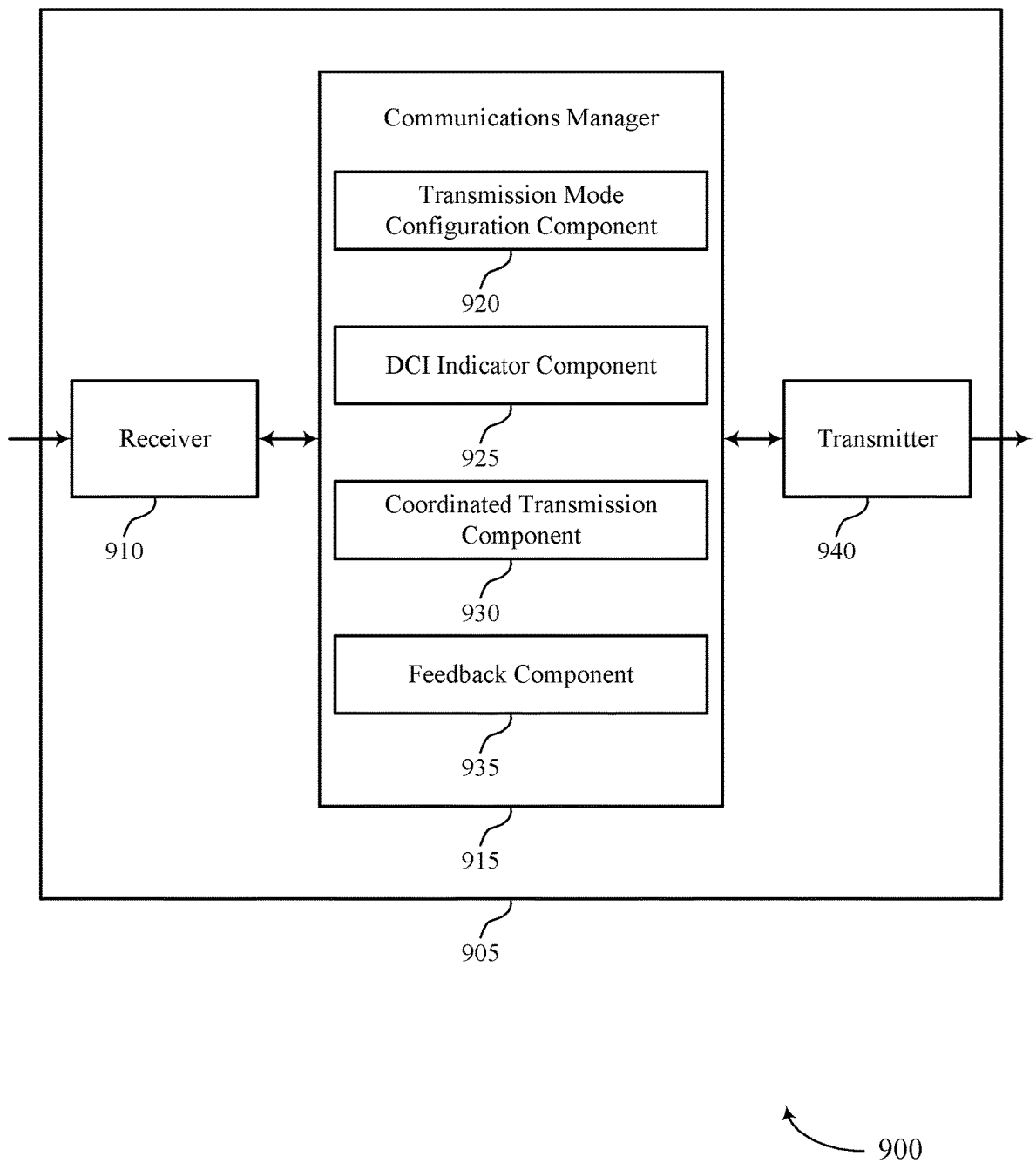

FIG. 9 shows a block diagram 900 of a device 905 that supports feedback design for multi-TRP transmission in accordance with aspects of the present disclosure. The device 905 may be an example of aspects of a device 805 or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to feedback design for multi-TRP transmission). Information may be passed on to other components of the device 905. The receiver 910 may be an example of aspects of the transceiver 1120 described with reference to FIG. 11. The receiver 910 may utilize a single antenna or multiple antennas.

The communications manager 915 may be an example of aspects of the communications manager 815 as described herein. The communications manager 915 may include a transmission mode configuration component 920, a DCI indicator component 925, a coordinated transmission component 930, and a feedback component 935. The communications manager 915 may be an example of aspects of the communications manager 1110 described herein.

The transmission mode configuration component 920 may receive a configuration message configuring the UE to communicate coordinated transmissions with a set of TRPs using a first coordinated transmission mode of a set of different coordinated transmission modes. The DCI indicator component 925 may receive, based on the configuration message, DCI including at least one indicator. The coordinated transmission component 930 may receive a first coordinated transmission communicated in accordance with the first coordinated transmission mode. The feedback component 935 may transmit, in accordance with a feedback configuration corresponding to the at least one indicator and the first coordinated transmission mode, a feedback message for the first coordinated transmission to at least one of the set of TRPs.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or multiple antennas.

Figure 10:
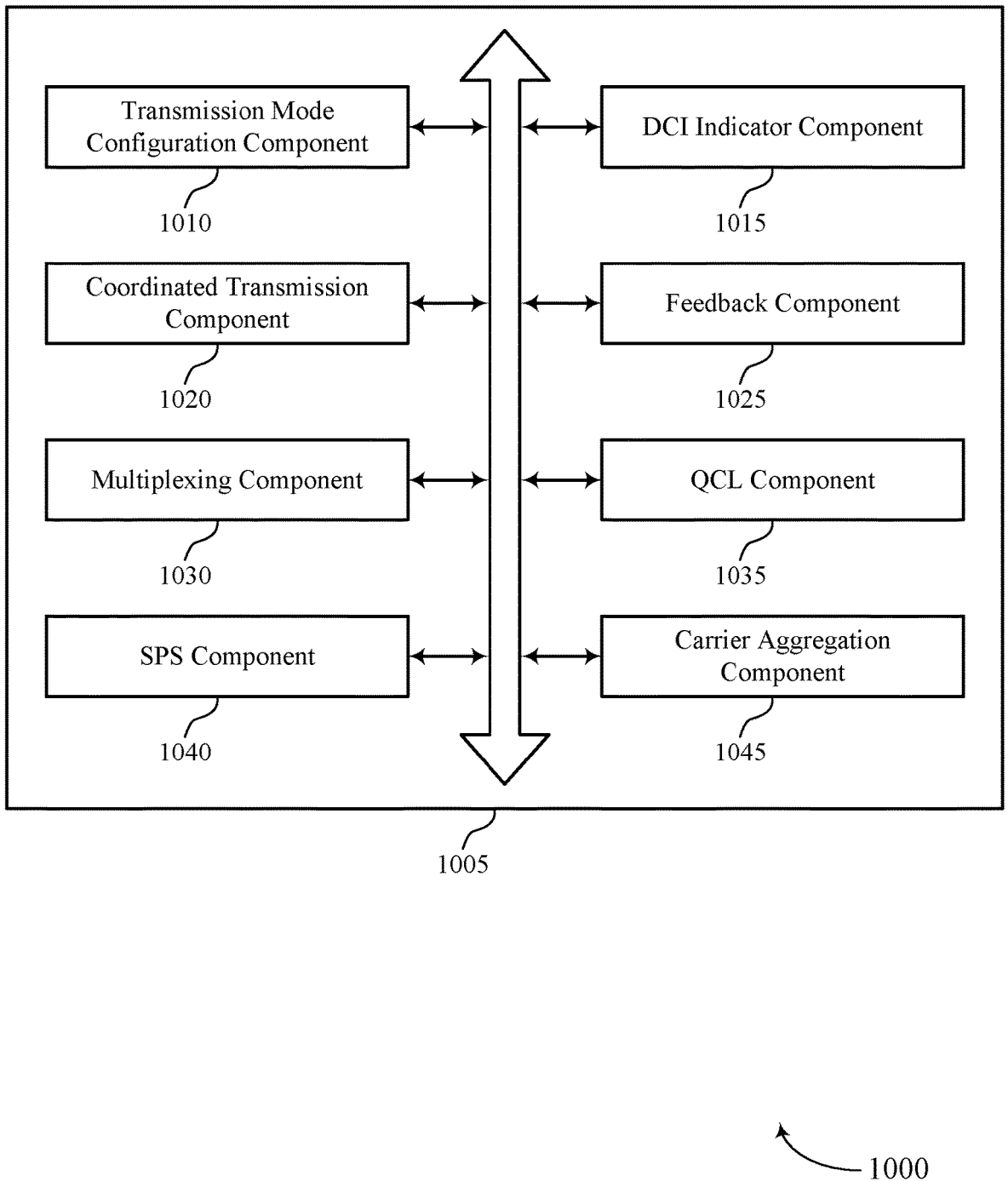
FIG. 10 shows a block diagram of a communications manager that supports feedback design for multi-TRP transmission in accordance with aspects of the present disclosure.

FIG. 10 shows a block diagram 1000 of a communications manager 1005 that supports feedback design for multi-TRP transmission in accordance with aspects of the present disclosure. The communications manager 1005 may be an example of aspects of a communications manager 815, a communications manager 915, or a communications manager 1110 described herein. The communications manager 1005 may include a transmission mode configuration component 1010, a DCI indicator component 1015, a coordinated transmission component 1020, a feedback component 1025, a multiplexing component 1030, a QCL component 1035, a SPS component 1040, and a carrier aggregation component 1045. Each of these modules may communicate, directly or indirectly, with one another (e.g., via one or more buses).

The transmission mode configuration component 1010 may receive a configuration message configuring the UE to communicate coordinated transmissions with a set of TRPs using a first coordinated transmission mode of a set of different coordinated transmission modes.

In some examples, the transmission mode configuration component 1010 may identify that the configuration message indicates that a PUCCH resource includes a first resource having first QCL information and a second resource having second QCL information, where the feedback message is transmitted via the first resource in accordance with the first QCL information and the feedback message is transmitted via the second resource in accordance with the second QCL information.

The DCI indicator component 1015 may receive, based on the configuration message, DCI including at least one indicator. In some cases, the at least one indicator includes a DAI indicator, a feedback resource indicator, a feedback gap indicator, or any combination thereof.

In some examples, determining that the at least one indicator includes a feedback resource indicator indicating a first PUCCH resource and a second PUCCH resource that is different than the first PUCCH resource, where the feedback message is transmitted via the first PUCCH resource and via the second PUCCH resource.

In some examples, the DCI indicator component 1015 may receive, within a same time interval, a first control channel transmission including the DCI from a first TRP of the set of TRPs and a second control channel transmission including second DCI from a second TRP of the set of TRPs, the second DCI including a second at least one indicator.

In some examples, the DCI indicator component 1015 may determine, based on the first coordinated transmission mode, that the first control channel transmission schedules the first coordinated transmission and that the second control channel transmission schedules a second coordinated transmission.

In some examples, the DCI indicator component 1015 may determine that the first coordinated transmission and the second coordinated transmission each include a same at least one codeword and a same at least one feedback process identifier associated with the at least one codeword. In some cases, the DCI indicator component 1015 may determine that a number of information bits in the feedback message is the same as the number of codewords scheduled by the DCI. In some examples, the DCI indicator component 1015 may determine, based on the first coordinated transmission mode, that the first control channel transmission schedules the first coordinated transmission and that a second control channel transmission schedules a second coordinated transmission.

In some examples, the DCI indicator component 1015 may determine that the first coordinated transmission and the second coordinated transmission each include a different codeword and a different feedback identifier associated with each of the different codewords. In some cases, the DCI schedules one or two codewords.

The coordinated transmission component 1020 may receive a first coordinated transmission communicated in accordance with the first coordinated transmission mode. In some examples, the coordinated transmission component 1020 may determine whether to decode the first coordinated transmission received from the first TRP based on a decoding decision for the second coordinated transmission received from the second TRP.

The feedback component 1025 may transmit, in accordance with a feedback configuration corresponding to the at least one indicator and the first coordinated transmission mode, a feedback message for the first coordinated transmission to at least one of the set of TRPs. In some examples, the feedback component 1025 may determine a number of information bits for the feedback message and a number of PUCCH transmissions in which to transmit the feedback message.

In some examples, the feedback component 1025 may determine that the at least one indicator includes a first resource indicator indicating a first PUCCH resource in a time interval and a second resource indicator indicating a second PUCCH resource in the TTI that is different than the first PUCCH resource, where the feedback message is transmitted via each of the first PUCCH resource and the second PUCCH resource within the time interval. In some cases, the time interval is a slot or a mini-slot.

In some examples, the feedback component 1025 may determine to transmit the feedback message for the first coordinated transmission and the second coordinated transmission in a single PUCCH transmission based on a first feedback gap indicator and a first feedback resource indicator included in the at least one indicator being the same as a second feedback gap indicator and a second feedback resource indicator included in the second at least one indicator.

In some examples, the feedback component 1025 may determine to transmit the feedback message for the first coordinated transmission and the second coordinated transmission in multiple PUCCH transmission based on at least one of a first feedback gap indicator or a first feedback resource indicator included in the at least one indicator differing from a second feedback gap indicator or a second feedback resource indicator included in the second at least one indicator.

In some examples, the feedback component 1025 may determine to transmit the feedback message in multiple PUCCH transmissions based on a first feedback gap indicator included in the at least one indicator differing from a second feedback gap indicator included in the second at least one indicator.

In some examples, the feedback component 1025 may determine a scrambling identifier corresponding to a TRP of the set of TRPs based on the at least one indicator. In some examples, the feedback component 1025 may transmit the feedback message via a physical uplink control channel to the TRP based on the scrambling identifier.

The multiplexing component 1030 may determine to multiplex or bundle information bits corresponding to each of the first and second coordinated transmissions in a single PUCCH transmission based on determining that a first feedback gap indicator included in the at least one indicator is the same as a second feedback gap indicator included in the second at least one indicator. In some examples, the multiplexing component 1030 may determine to multiplex or bundle information bits is based on the configuration message.

In some examples, the multiplexing component 1030 may identify a feedback resource for transmitting the feedback message based on a feedback resource indicator and a DAI indicator included in the at least one indicator associated with a defined monitoring occasion of the set of PDCCH monitoring occasions. In some cases, the ordering of the set of PDCCH monitoring occasions corresponds to an ordering of a set of control resource set identifiers indicated in the configuration message. In some cases, each of the set of control resource set identifiers is respectively associated with the set of PDCCH monitoring occasion, and where each control resource set of a set of control resource sets corresponds to one of the set of control resource set identifiers and one of the TRPs.

The QCL component 1035 may determine a PUCCH resource indicated by a feedback resource indicator of the at least one indicator. In some examples, the QCL component 1035 may identify QCL information for the PUCCH resource. In some examples, the QCL component 1035 may determine a number of TRPs to which the UE is to transmit the feedback message based on the QCL information. In some examples, the QCL component 1035 may determine that a PUCCH transmission including the feedback message is to be transmitted to a single TRP of the set of TRPs based on the QCL information indicating that the PUCCH resource has a QCL relationship with a single downlink reference signal and transmit the feedback message in accordance with the QCL information for the PUCCH resource.

In some examples, the QCL component 1035 may determine that PUCCH transmission including the feedback message is to be transmitted to multiple TRPs of the set of TRPs based on the QCL information indicating that the PUCCH resource has a QCL relationship with a set of different downlink reference signals.

In some examples, the QCL component 1035 may determine a transmission power for a PUCCH transmission including the feedback message based on a path-loss calculation using a first downlink reference signal of the set of different downlink reference signals that experienced a larger path loss and transmit the PUCCH transmission including the feedback message using the determined transmission power.

The SPS component 1040 may determine a semi-persistent schedule configuration for a PDSCH based on the configuration message. In some examples, the SPS component 1040 may transmit a PUCCH transmission once per each PDSCH occasion based on the semi-persistent schedule configuration. In some cases, the semi-persistent schedule configuration indicates a first PUCCH resource and a second PUCCH resource per PDSCH occasion and a time offset between the first PUCCH resource and the second PUCCH resource.

In some examples, the SPS component 1040 may transmit a first PUCCH transmission to a first TRP of the set of TRPs and a second PUCCH transmission to a second TRP of the set of TRPs once per each PDSCH occasion, where the first PUCCH transmission and the second PUCCH transmission include the same feedback message. In some cases, the first PUCCH transmission and the second PUCCH transmission are transmitted in a same time interval. In some cases, the first PUCCH transmission and the second PUCCH transmission are transmitted in different time intervals.

The carrier aggregation component 1045 may determine, based on the UE operating in a carrier aggregation configuration, that information bits for a set of feedback message including the feedback message are scheduled to be transmitted in a same time interval. In some examples, the carrier aggregation component 1045 may multiplex or bundle the information bits for the set of feedback message to generate a combined feedback message. In some examples, the carrier aggregation component 1045 may transmit the combined feedback message. In some examples, the carrier aggregation component 1045 may determine that an ordering of the information bits on a carrier index and an identifier of a PDCCH resource used to transmit the DCI that schedules the information bits FIG. 11 shows a diagram of a system 1100 including a device 1105 that supports feedback design for multi-TRP transmission in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a configuration message configuring the UE to communicate coordinated transmissions with a set of TRPs using a first coordinated transmission mode of a set of different coordinated transmission modes, receive, based on the configuration message, DCI including at least one indicator, receive a first coordinated transmission communicated in accordance with the first coordinated transmission mode, and transmit, in accordance with a feedback configuration corresponding to the at least one indicator and the first coordinated transmission mode, a feedback message for the first coordinated transmission to at least one of the set of TRPs.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the device 1105 may include a single antenna 1125, or the device 1105 may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting feedback design for multi-TRP transmission).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
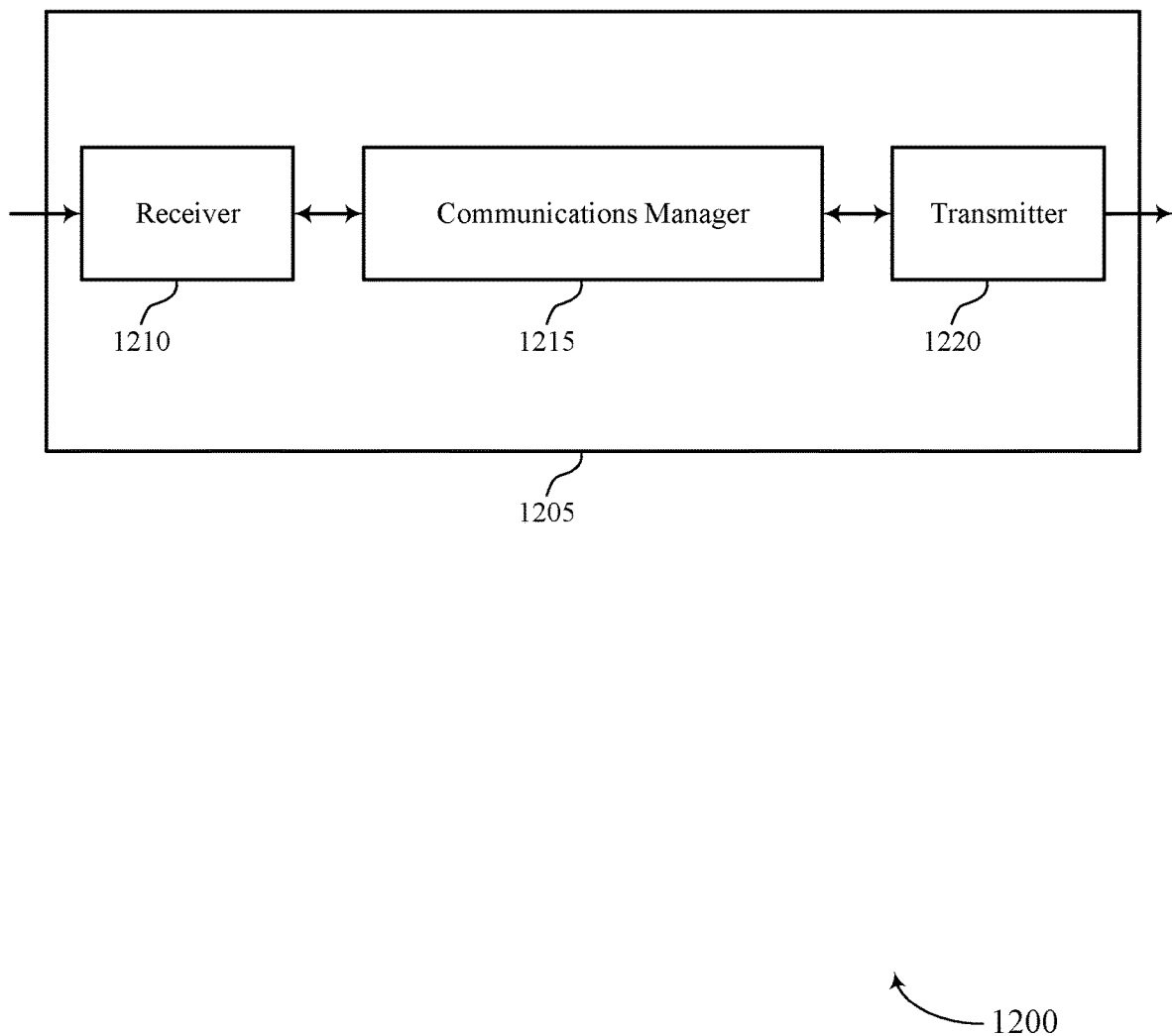
FIGS. 12 and 13 show block diagrams of devices that support feedback design for multi-TRP transmission in accordance with aspects of the present disclosure.

FIG. 12 shows a block diagram 1200 of a device 1205 that supports feedback design for multi-TRP transmission in accordance with aspects of the present disclosure. The device 1205 may be an example of aspects of a base station 105 or a TRP 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback design for multi-TRP transmission). Information may be passed on to other components of the device 1205. The receiver 1210 may be an example of aspects of the transceiver 1520 described with reference to FIG. 15. The receiver 1210 may utilize a single antenna or multiple antennas.

The communications manager 1215 may transmit a configuration message for configuring a UE to communicate coordinated transmissions with a set of TRPs using a first coordinated transmission mode of a set of different coordinated transmission modes, transmit, based on the configuration message, DCI including at least one indicator, and receive, in accordance with a feedback configuration corresponding to the at least one indicator and the first coordinated transmission mode, a feedback message for a first coordinated transmission. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

Figure 13:
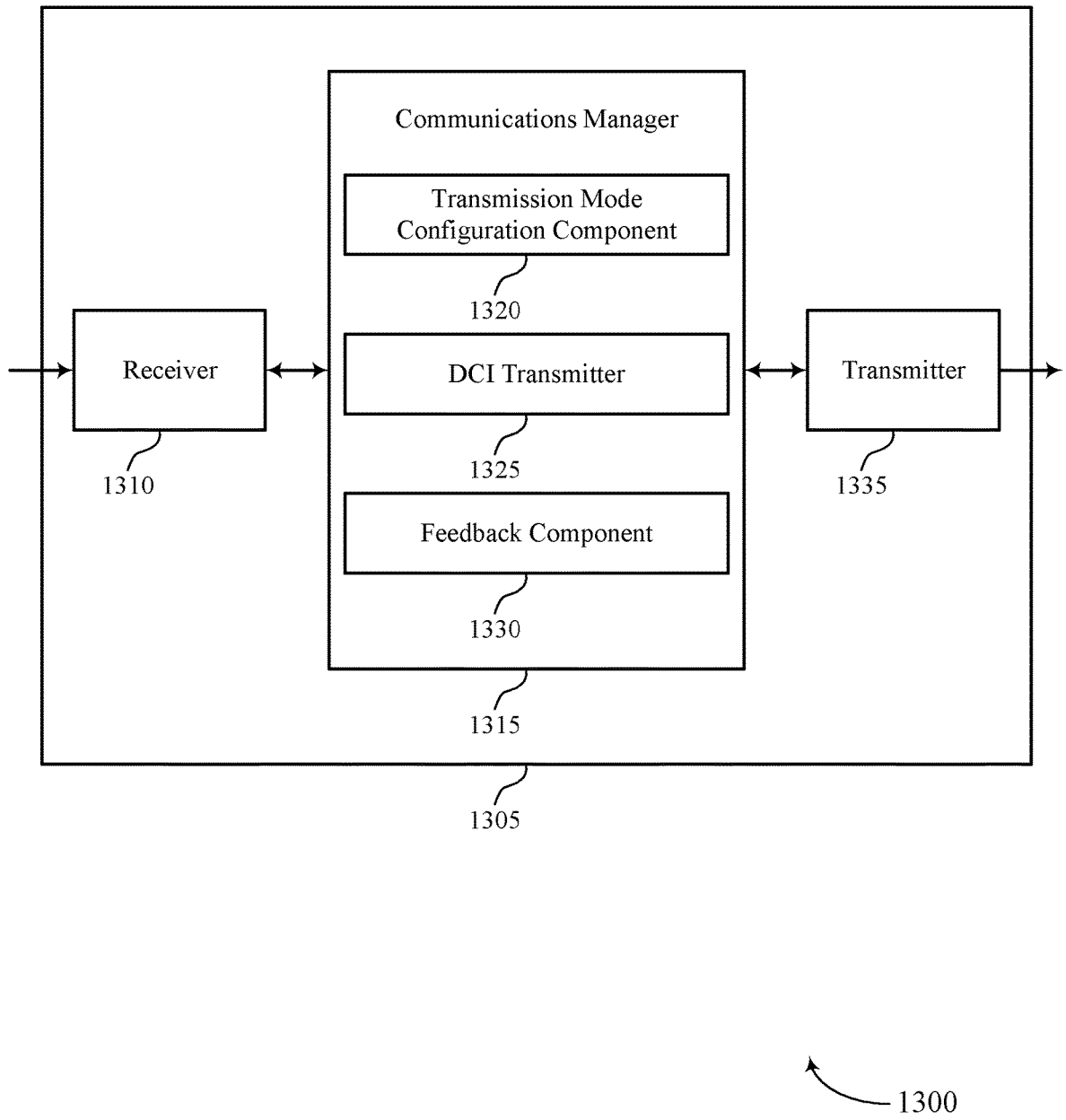

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or multiple antennas. FIG. 13 shows a block diagram 1300 of a device 1305 that supports feedback design for multi-TRP transmission in accordance with aspects of the present disclosure. The device 1305 may be an example of aspects of a device 1205, a base station 105, or a TRP 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to feedback design for multi-TRP transmission). Information may be passed on to other components of the device 1305. The receiver 1310 may be an example of aspects of the transceiver 1520 described with reference to FIG. 15. The receiver 1310 may utilize a single antenna or multiple antennas.

The communications manager 1315 may be an example of aspects of the communications manager 1215 as described herein. The communications manager 1315 may include a transmission mode configuration component 1320, a DCI transmitter 1325, and a feedback component 1330. The communications manager 1315 may be an example of aspects of the communications manager 1510 described herein.

The transmission mode configuration component 1320 may transmit a configuration message for configuring a UE to communicate coordinated transmissions with a set of TRPs using a first coordinated transmission mode of a set of different coordinated transmission modes. The DCI transmitter 1325 may transmit, based on the configuration message, DCI including at least one indicator. The feedback component 1330 may receive, in accordance with a feedback configuration corresponding to the at least one indicator and the first coordinated transmission mode, a feedback message for a first coordinated transmission.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or multiple antennas.

Figure 14:
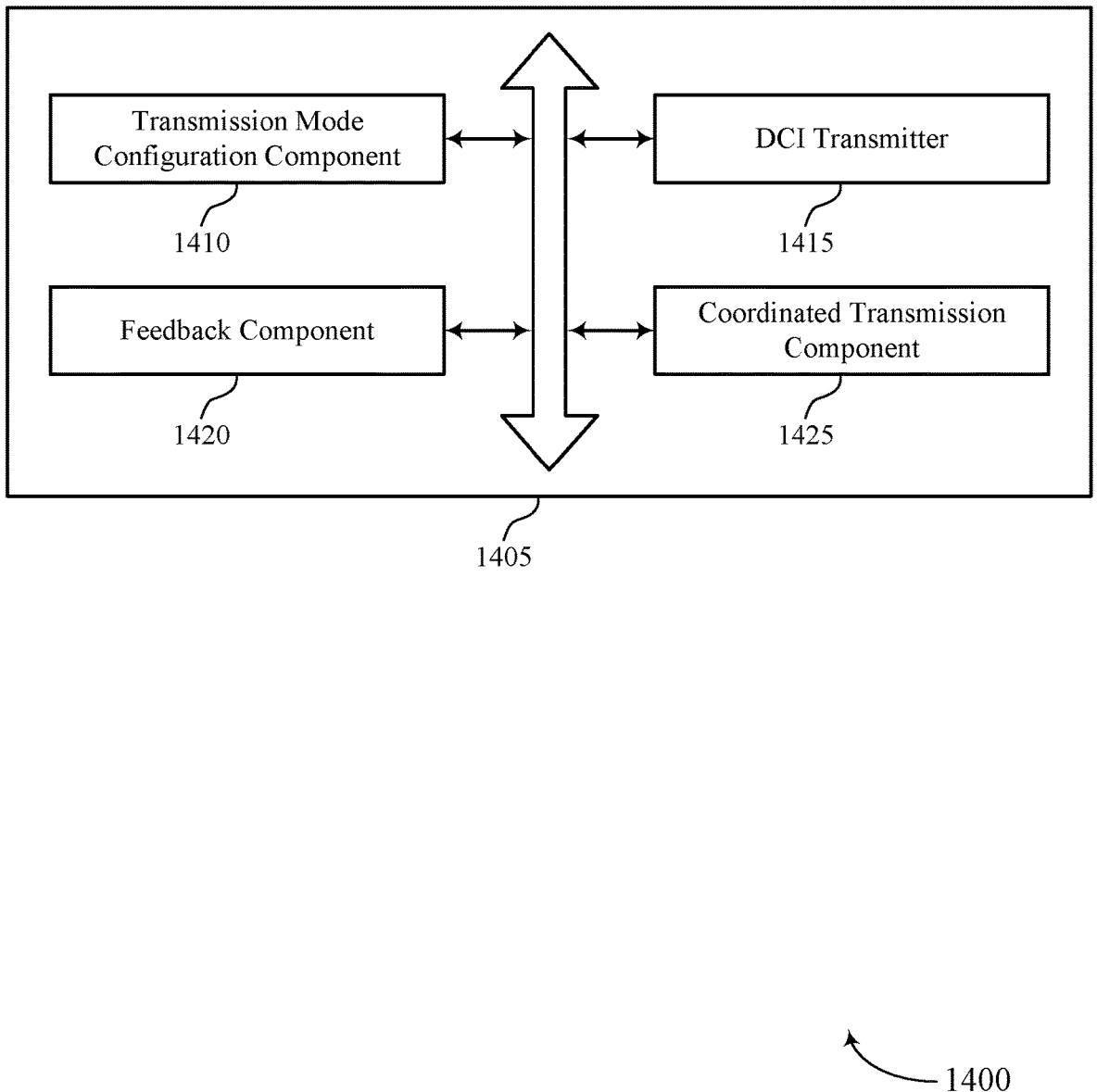
FIG. 14 shows a block diagram of a communications manager that supports feedback design for multi-TRP transmission in accordance with aspects of the present disclosure.

FIG. 14 shows a block diagram 1400 of a communications manager 1405 that supports feedback design for multi-TRP transmission in accordance with aspects of the present disclosure. The communications manager 1405 may be an example of aspects of a communications manager 1215, a communications manager 1315, or a communications manager 1510 described herein. The communications manager 1405 may include a transmission mode configuration component 1410, a DCI transmitter 1415, a feedback component 1420, and a coordinated transmission component 1425. Each of these modules may communicate, directly or indirectly, with one another (e.g., via one or more buses).

The transmission mode configuration component 1410 may transmit a configuration message for configuring a UE to communicate coordinated transmissions with a set of TRPs using a first coordinated transmission mode of a set of different coordinated transmission modes.

The DCI transmitter 1415 may transmit, based on the configuration message, DCI including at least one indicator. In some cases, the at least one indicator includes a DAI indicator, a feedback resource indicator, a feedback gap indicator, or any combination thereof.

The feedback component 1420 may receive, in accordance with a feedback configuration corresponding to the at least one indicator and the first coordinated transmission mode, a feedback message for a first coordinated transmission. In some examples, the feedback component 1420 may determine a number of information bits for the feedback message and a number of PUCCH transmissions in which the UE is to transmit the feedback message. In some cases, the feedback message is received from the UE. In some cases, the feedback message is received from a second base station via a backhaul link.

The coordinated transmission component 1425 may transmit the first coordinated transmission in accordance with the first coordinated transmission mode. In some examples, the coordinated transmission component 1425 may receive an indication that a second base station transmitted the first coordinated transmission in accordance with the first coordinated transmission mode.

Figure 15:
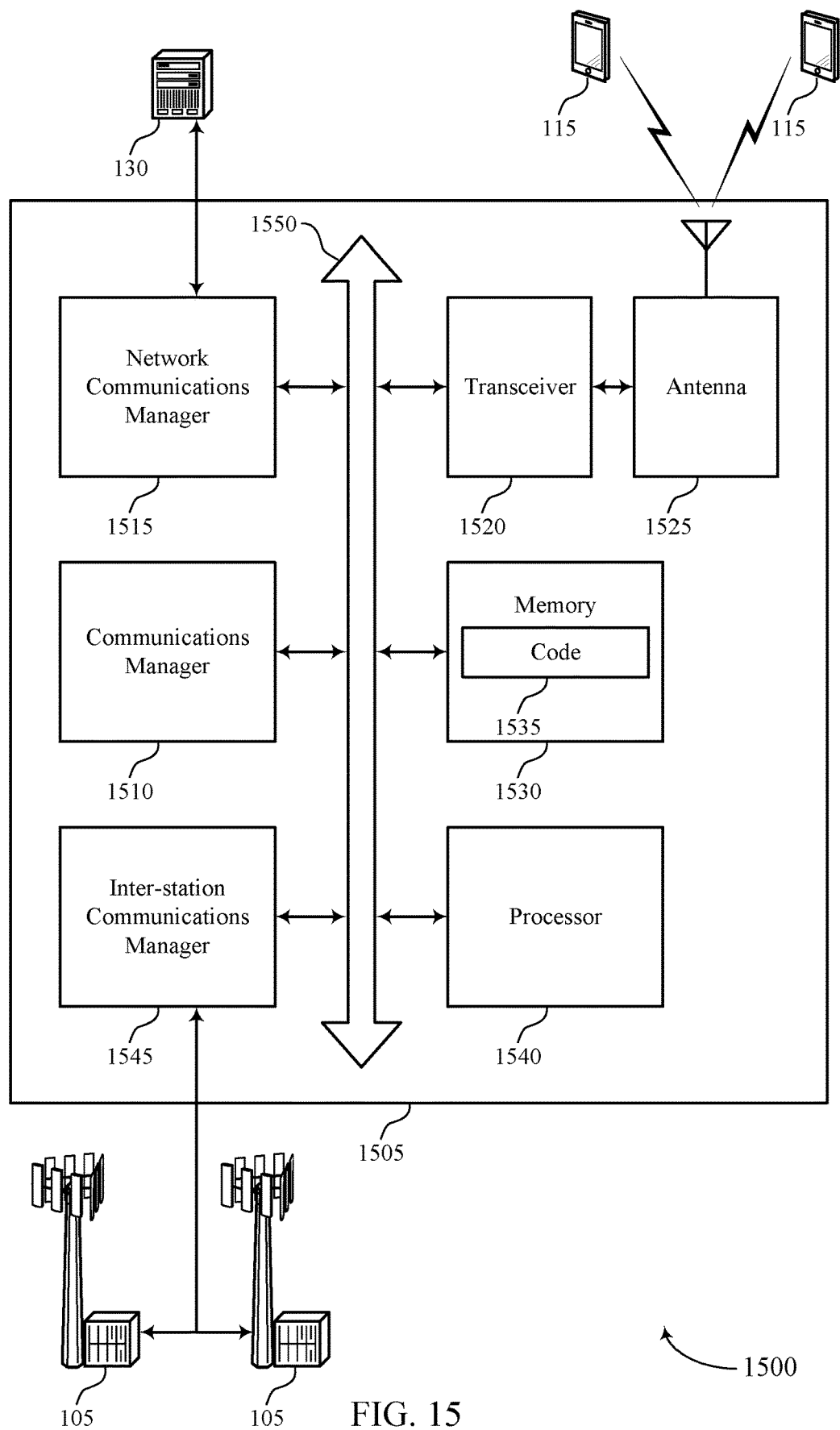
FIG. 15 shows a diagram of a system including a device that supports feedback design for multi-TRP transmission in accordance with aspects of the present disclosure.

FIG. 15 shows a diagram of a system 1500 including a device 1505 that supports feedback design for multi-TRP transmission in accordance with aspects of the present disclosure. The device 1505 may be an example of or include the components of device 1205, device 1305, a TRP 105, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a configuration message for configuring a UE to communicate coordinated transmissions with a set of TRPs using a first coordinated transmission mode of a set of different coordinated transmission modes, transmit, based on the configuration message, DCI including at least one indicator, and receive, in accordance with a feedback configuration corresponding to the at least one indicator and the first coordinated transmission mode, a feedback message for a first coordinated transmission.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the device 1505 may include a single antenna 1525, or the device 1505 may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting feedback design for multi-TRP transmission).

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
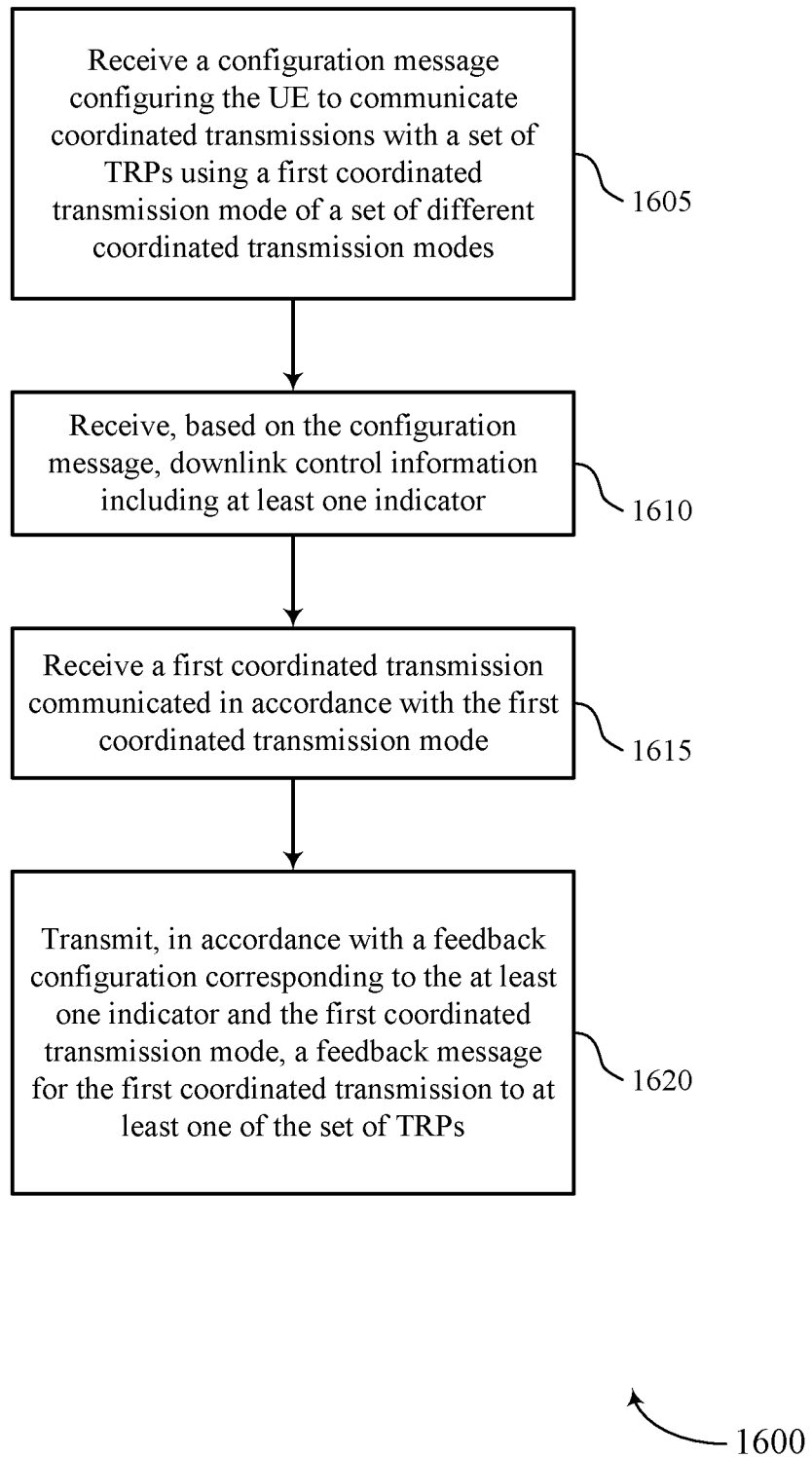
FIGS. 16 through 20 show flowcharts illustrating methods that support feedback design for multi-TRP transmission in accordance with aspects of the present disclosure.

FIG. 16 shows a flowchart illustrating a method 1600 that supports feedback design for multi-TRP transmission in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a configuration message configuring the UE to communicate coordinated transmissions with a set of TRPs using a first coordinated transmission mode of a set of different coordinated transmission modes. The operations of 1605 may be performed according to the methods described herein. In some examples, aspects of the operations of 1605 may be performed by a transmission mode configuration component as described with reference to FIGS. 8 through 11.

At 1610, the UE may receive, based on the configuration message, DCI including at least one indicator. The operations of 1610 may be performed according to the methods described herein. In some examples, aspects of the operations of 1610 may be performed by a DCI indicator component as described with reference to FIGS. 8 through 11.

At 1615, the UE may receive a first coordinated transmission communicated in accordance with the first coordinated transmission mode. The operations of 1615 may be performed according to the methods described herein. In some examples, aspects of the operations of 1615 may be performed by a coordinated transmission component as described with reference to FIGS. 8 through 11.

At 1620, the UE may transmit, in accordance with a feedback configuration corresponding to the at least one indicator and the first coordinated transmission mode, a feedback message for the first coordinated transmission to at least one of the set of TRPs. The operations of 1620 may be performed according to the methods described herein. In some examples, aspects of the operations of 1620 may be performed by a feedback component as described with reference to FIGS. 8 through 11.

Figure 17:
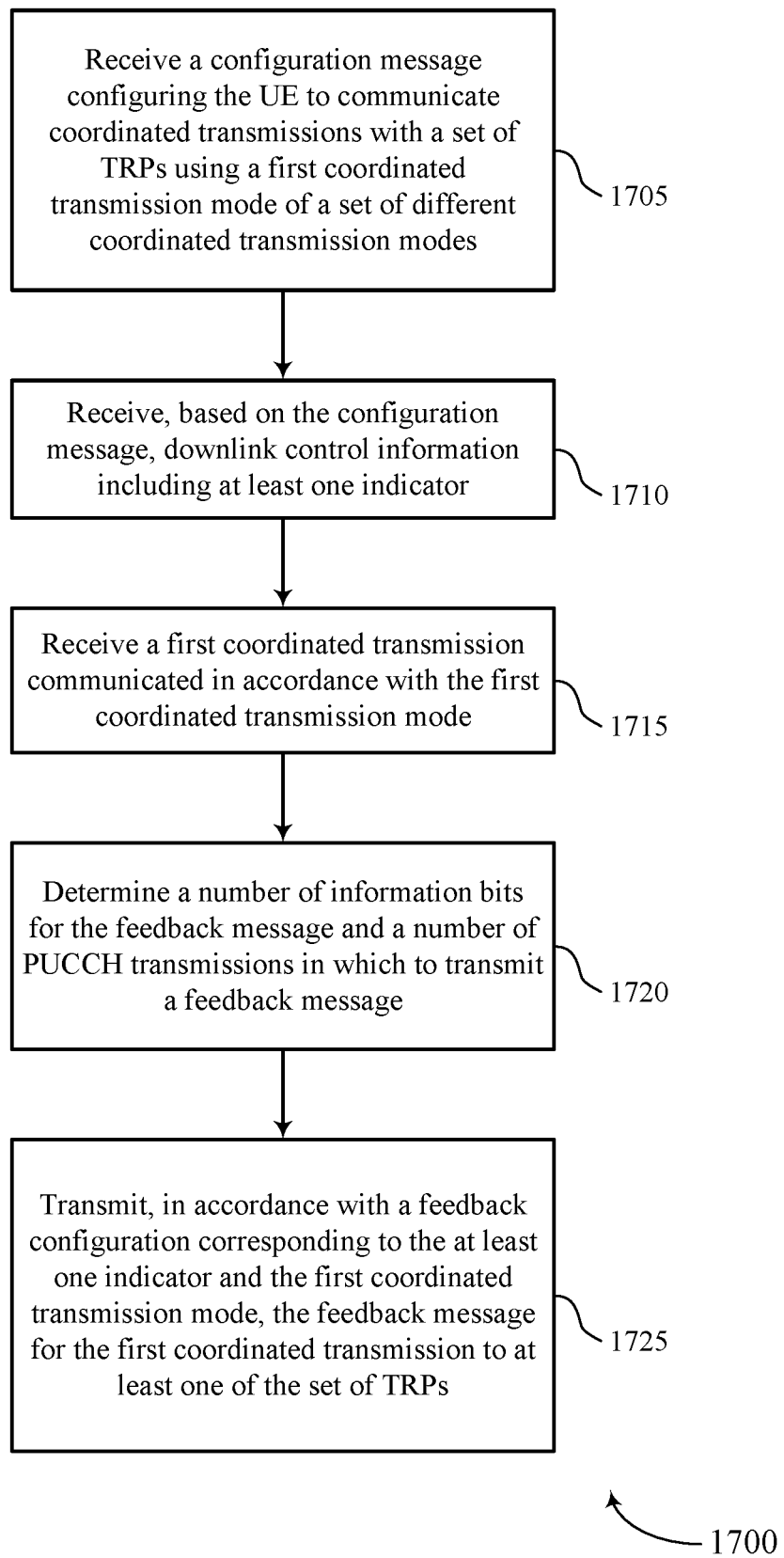

FIG. 17 shows a flowchart illustrating a method 1700 that supports feedback design for multi-TRP transmission in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive a configuration message configuring the UE to communicate coordinated transmissions with a set of TRPs using a first coordinated transmission mode of a set of different coordinated transmission modes. The operations of 1705 may be performed according to the methods described herein. In some examples, aspects of the operations of 1705 may be performed by a transmission mode configuration component as described with reference to FIGS. 8 through 11.

At 1710, the UE may receive, based on the configuration message, DCI including at least one indicator. The operations of 1710 may be performed according to the methods described herein. In some examples, aspects of the operations of 1710 may be performed by a DCI indicator component as described with reference to FIGS. 8 through 11.

At 1715, the UE may receive a first coordinated transmission communicated in accordance with the first coordinated transmission mode. The operations of 1715 may be performed according to the methods described herein. In some examples, aspects of the operations of 1715 may be performed by a coordinated transmission component as described with reference to FIGS. 8 through 11.

At 1720, the UE may determine a number of information bits for the feedback message and a number of PUCCH transmissions in which to transmit the feedback message. The operations of 1720 may be performed according to the methods described herein. In some examples, aspects of the operations of 1720 may be performed by a feedback component as described with reference to FIGS. 8 through 11.

At 1725, the UE may transmit, in accordance with a feedback configuration corresponding to the at least one indicator and the first coordinated transmission mode, a feedback message for the first coordinated transmission to at least one of the set of TRPs. The operations of 1725 may be performed according to the methods described herein. In some examples, aspects of the operations of 1725 may be performed by a feedback component as described with reference to FIGS. 8 through 11.

Figure 18:
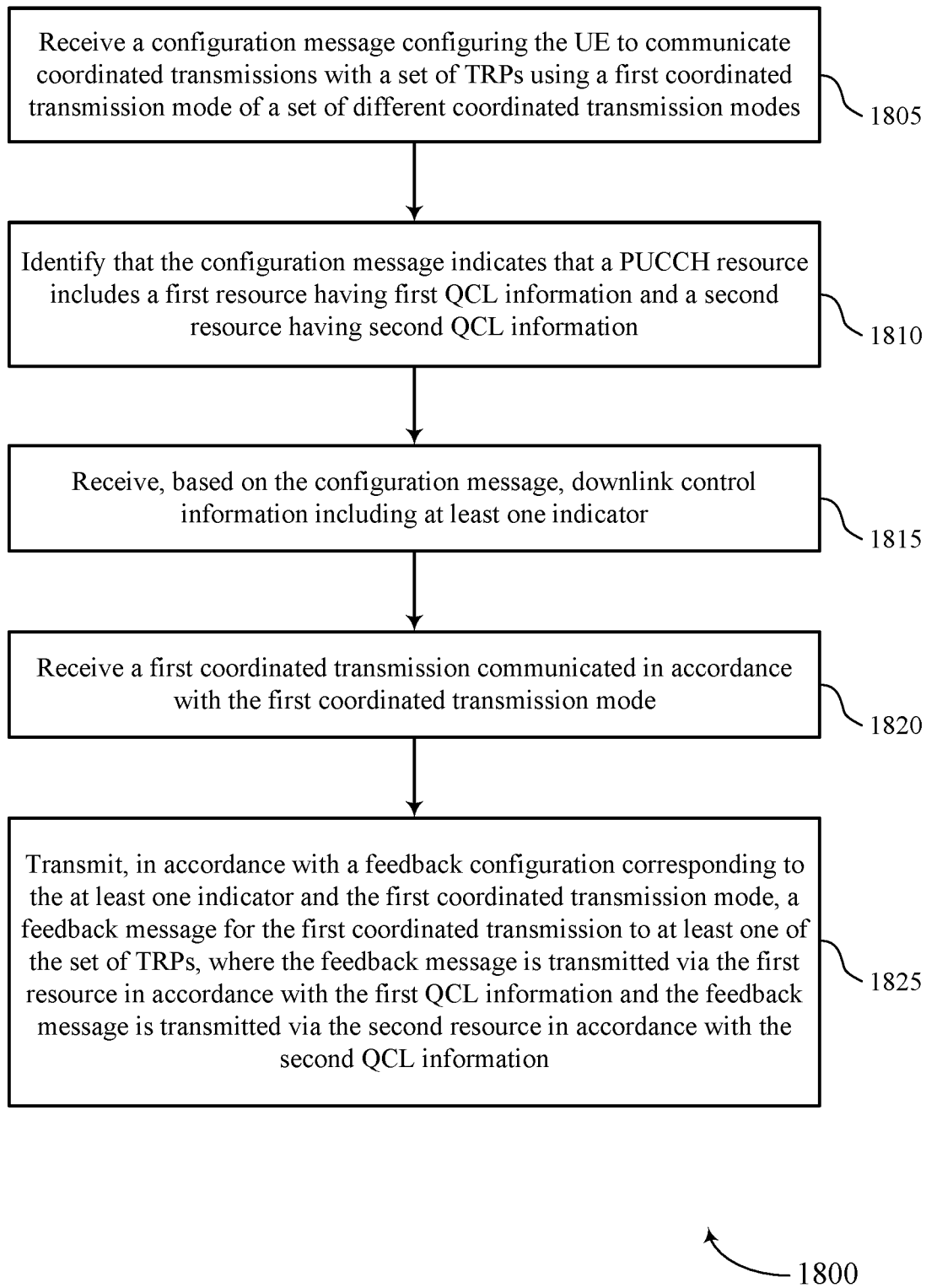

FIG. 18 shows a flowchart illustrating a method 1800 that supports feedback design for multi-TRP transmission in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may receive a configuration message configuring the UE to communicate coordinated transmissions with a set of TRPs using a first coordinated transmission mode of a set of different coordinated transmission modes. The operations of 1805 may be performed according to the methods described herein. In some examples, aspects of the operations of 1805 may be performed by a transmission mode configuration component as described with reference to FIGS. 8 through 11.

At 1810, the UE may identify that the configuration message indicates that a PUCCH resource includes a first resource having first QCL information and a second resource having second QCL information, where the feedback message is transmitted via the first resource in accordance with the first QCL information and the feedback message is transmitted via the second resource in accordance with the second QCL information. The operations of 1810 may be performed according to the methods described herein. In some examples, aspects of the operations of 1810 may be performed by a transmission mode configuration component as described with reference to FIGS. 8 through 11.

At 1815, the UE may receive, based on the configuration message, DCI including at least one indicator. The operations of 1815 may be performed according to the methods described herein. In some examples, aspects of the operations of 1815 may be performed by a DCI indicator component as described with reference to FIGS. 8 through 11.

At 1820, the UE may receive a first coordinated transmission communicated in accordance with the first coordinated transmission mode. The operations of 1820 may be performed according to the methods described herein. In some examples, aspects of the operations of 1820 may be performed by a coordinated transmission component as described with reference to FIGS. 8 through 11.

At 1825, the UE may transmit, in accordance with a feedback configuration corresponding to the at least one indicator and the first coordinated transmission mode, a feedback message for the first coordinated transmission to at least one of the set of TRPs. The operations of 1825 may be performed according to the methods described herein. In some examples, aspects of the operations of 1825 may be performed by a feedback component as described with reference to FIGS. 8 through 11.

Figure 19:
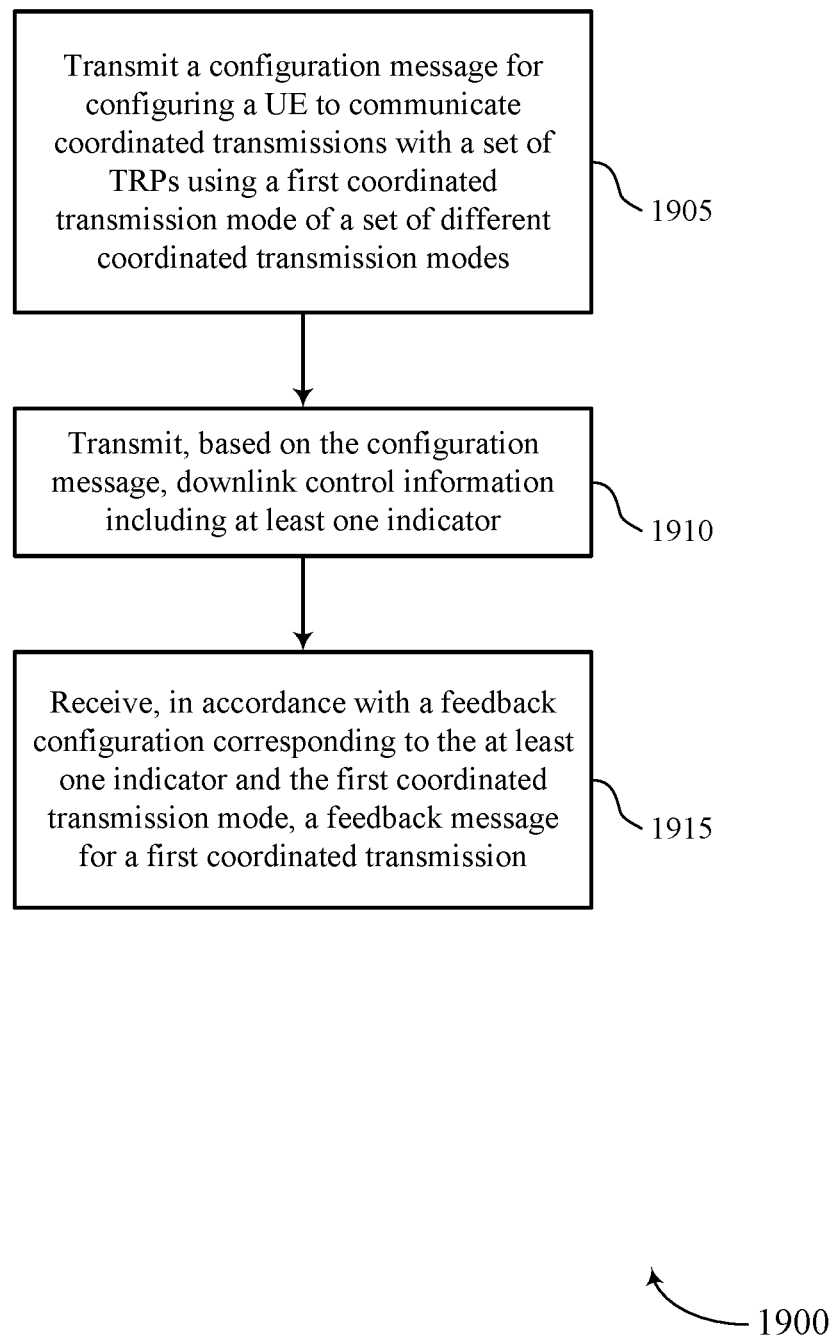

FIG. 19 shows a flowchart illustrating a method 1900 that supports feedback design for multi-TRP transmission in accordance with aspects of the present disclosure. The operations of method 1900 may be implemented by a TRP 105, a base station 105, or the components of a base station 105 or a TRP 105 as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may transmit a configuration message for configuring a UE to communicate coordinated transmissions with a set of TRPs using a first coordinated transmission mode of a set of different coordinated transmission modes. The operations of 1905 may be performed according to the methods described herein. In some examples, aspects of the operations of 1905 may be performed by a transmission mode configuration component as described with reference to FIGS. 12 through 15.

At 1910, the base station may transmit, based on the configuration message, DCI including at least one indicator. The operations of 1910 may be performed according to the methods described herein. In some examples, aspects of the operations of 1910 may be performed by a DCI transmitter as described with reference to FIGS. 12 through 15.

At 1915, the base station may receive, in accordance with a feedback configuration corresponding to the at least one indicator and the first coordinated transmission mode, a feedback message for a first coordinated transmission. The operations of 1915 may be performed according to the methods described herein. In some examples, aspects of the operations of 1915 may be performed by a feedback component as described with reference to FIGS. 12 through 15.

Figure 20:
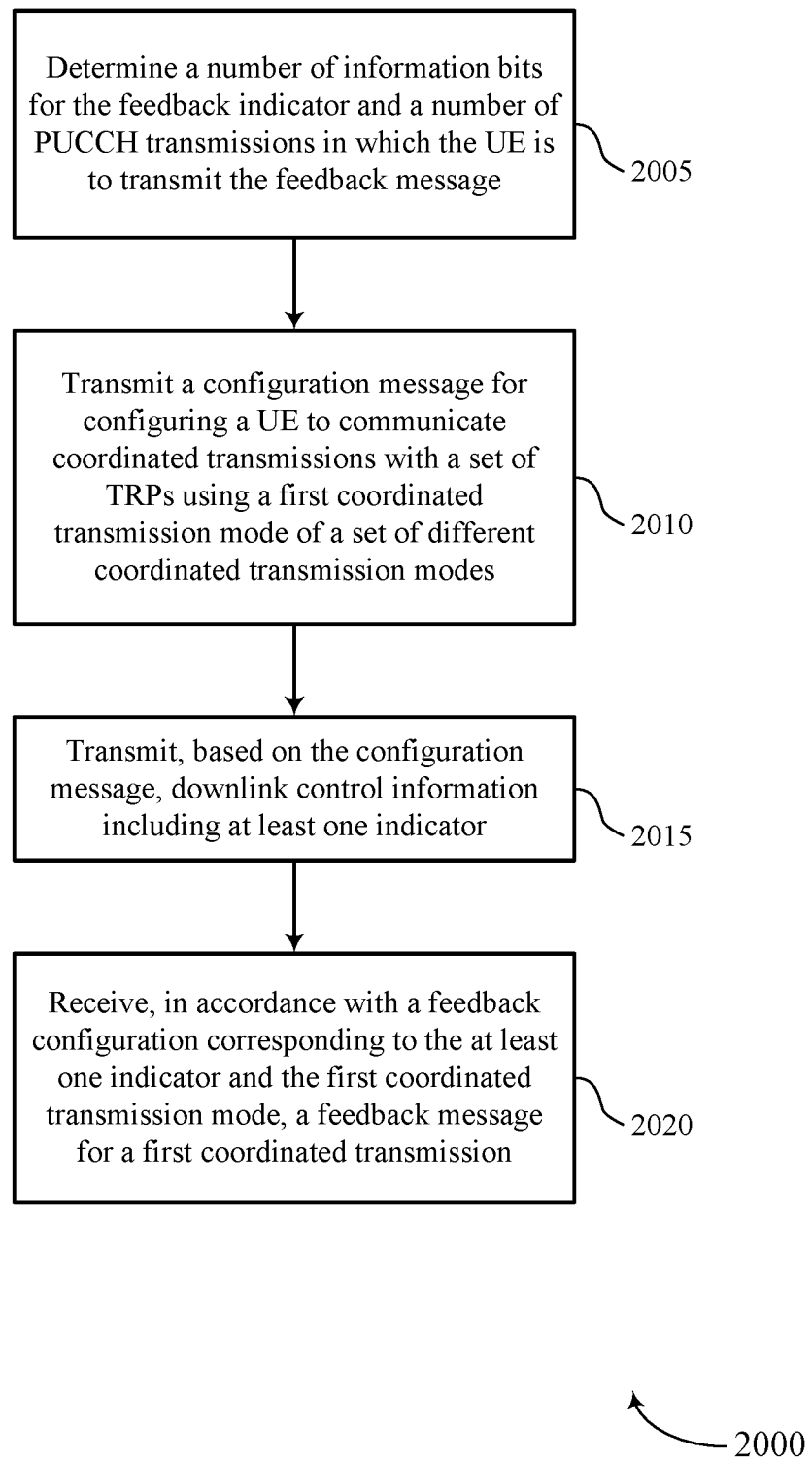

FIG. 20 shows a flowchart illustrating a method 2000 that supports feedback design for multi-TRP transmission in accordance with aspects of the present disclosure. The operations of method 2000 may be implemented by a TRP 105, a base station 105, or the components of a base station 105 or a TRP 105 as described herein. For example, the operations of method 2000 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2005, the base station may determine a number of information bits for the feedback message and a number of PUCCH transmissions in which the UE is to transmit the feedback message. The operations of 2005 may be performed according to the methods described herein. In some examples, aspects of the operations of 2005 may be performed by a feedback component as described with reference to FIGS. 12 through 15.

At 2010, the base station may transmit a configuration message for configuring a UE to communicate coordinated transmissions with a set of TRPs using a first coordinated transmission mode of a set of different coordinated transmission modes. The operations of 2010 may be performed according to the methods described herein. In some examples, aspects of the operations of 2010 may be performed by a transmission mode configuration component as described with reference to FIGS. 12 through 15.

At 2015, the base station may transmit, based on the configuration message, DCI including at least one indicator. The operations of 2015 may be performed according to the methods described herein. In some examples, aspects of the operations of 2015 may be performed by a DCI transmitter as described with reference to FIGS. 12 through 15.

At 2020, the base station may receive, in accordance with a feedback configuration corresponding to the at least one indicator and the first coordinated transmission mode, a feedback message for a first coordinated transmission. The operations of 2020 may be performed according to the methods described herein. In some examples, aspects of the operations of 2020 may be performed by a feedback component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
    a transceiver;
    at least one processor; and
    at least one memory comprising instructions executable by the at least one processor to cause the UE to:
        receive, via the transceiver, a configuration message indicating an uplink control channel resource, wherein the uplink control channel resource comprises a first set of time and frequency resources and a second set of time and frequency resources, the first set of time and frequency resources of the uplink control channel resource are quasi co-located with a first downlink reference signal in accordance with a first quasi co-location relationship and the second set of time and frequency resources of the uplink control channel resource are quasi co-located with a second downlink reference signal in accordance with a second quasi co-location relationship, the second quasi co-location relationship being different from the first quasi co-location relationship; and
        transmit, via the transceiver, a first copy of a feedback message in a first beam direction associated with the first quasi co-location relationship via the first set of time and frequency resources and a second copy of the feedback message in a second beam direction associated with the second quasi co-location relationship via the second set of time and frequency resources, wherein the feedback message combines feedback for multiple messages based on a feedback gap indicator.

2. The UE of claim 1, wherein the instructions are executable by the at least one processor to further cause the UE to:
    receive, via the transceiver, control information comprising an indicator indicating the first set of time and frequency resources and the second set of time and frequency resources, wherein transmitting the first copy of the feedback message via the first set of time and frequency resources and the second copy of the feedback message via the second set of time and frequency resources occurs after receiving the control information.

3. The UE of claim 2, wherein the indicator comprises an assignment index (DAI) indicator, a feedback resource indicator, or the feedback gap indicator.

4. The UE of claim 1, wherein the first copy of the feedback message is transmitted to a first transmission reception point using the first quasi co-location relationship indicating the first beam direction associated with the first transmission reception point; and the second copy of the feedback message is transmitted to a second transmission reception point using the second quasi co-location relationship indicating the second beam direction associated with the second transmission reception point.

5. The UE of claim 1, wherein the configuration message comprises a semi-persistent scheduling configuration that configures the first set of time and frequency resources and the second set of time and frequency resources.

6. The UE of claim 1, wherein the first set of time and frequency resources and the second set of time and frequency resources are associated with a same slot.

7. The UE of claim 1, wherein the first set of time and frequency resources is associated with a first slot and the second set of time and frequency resources are associated with a second slot different from the first slot.

8. The UE of claim 1, wherein the second downlink reference signal is different from the first downlink reference signal.

9. A transmission reception point, comprising:
    a transceiver;
    at least one processor; and
    at least one memory comprising instructions executable by the at least one processor to cause the transmission reception point to:
        transmit, via the transceiver, a configuration message indicating an uplink control channel resource, wherein the uplink control channel resource comprises a first set of time and frequency resources and a second set of time and frequency resources, the first set of time and frequency resources of the uplink control channel resource are quasi co-located with a first downlink reference signal in accordance with a first quasi co-location relationship and the second set of time and frequency resources of the uplink control channel resource are quasi co-located with a second downlink reference signal in accordance with a second quasi co-location relationship, the second quasi co-location relationship being different from the first quasi co-location relationship; and
        receive, via the transceiver, a first copy of a feedback message via the first set of time and frequency resources in accordance with a first beam direction associated with the first quasi co-location relationship or a second copy of the feedback message via the second set of time and frequency resources in accordance with a second beam direction associated with the second quasi co-location relationship, wherein the feedback message combines feedback for multiple messages based on a feedback gap indicator.

10. The transmission reception point of claim 9, wherein the instructions are executable by the at least one processor to further cause the transmission reception point to:
transmit, via the transceiver, control information comprising an indicator indicating the first set of time and frequency resources and the second set of time and frequency resources, wherein receiving the first copy of the feedback message via at least one of the first set of time and frequency resources or receiving the second copy of the feedback message via the second set of time and frequency resources occurs after transmitting the control information.

11. The transmission reception point of claim 10, wherein the indicator comprises an assignment index (DAI) indicator, a feedback resource indicator, or the feedback gap indicator.

12. The transmission reception point of claim 9, wherein reception of first copy of the feedback message further comprises instructions executable by the at least one processor to further cause the transmission reception point to:
receive, via the transceiver, the first copy of the feedback message from a user equipment (UE) via the first set of time and frequency resources.

13. The transmission reception point of claim 9, wherein receiving the first copy of the feedback message via the first set of time and frequency resources is based at least in part on the first quasi co-location relationship indicating the first beam direction associated with the transmission reception point.

14. The transmission reception point of claim 9, wherein the configuration message comprises a semi-persistent scheduling configuration that configures the first set of time and frequency resources and the second set of time and frequency resources.

15. The transmission reception point of claim 9, wherein the first set of time and frequency resources is associated with a first slot and the second set of time and frequency resources is associated with the first slot or a second slot that is different from the first slot.

16. The transmission reception point of claim 9, wherein the second downlink reference signal is different from the first downlink reference signal.

17. A method for wireless communication by a user equipment (UE), comprising:
receiving a configuration message indicating an uplink control channel resource, wherein the uplink control channel resource comprises a first set of time and frequency resources and a second set of time and frequency resources, the first set of time and frequency resources of the uplink control channel resource are quasi co-located with a first downlink reference signal in accordance with a first quasi co-location relationship and the second set of time and frequency resources of the uplink control channel resource are quasi co-located with a second downlink reference signal in accordance with a second quasi co-location relationship, the second quasi co-location relationship being different from the first quasi co-location relationship; and
transmitting a first copy of a feedback message in a first beam direction associated with the first quasi co-location relationship via the first set of time and frequency resources and a second copy of the feedback message in a second beam direction associated with the second quasi co-location relationship via the second set of time and frequency resources, wherein the feedback message combines feedback for multiple messages based on a feedback gap indicator.

18. The method of claim 17, further comprising:
receiving control information comprising an indicator indicating the first set of time and frequency resources and the second set of time and frequency resources, wherein transmitting the first copy of the feedback message via the first set of time and frequency resources and the second copy of the feedback message via the second set of time and frequency resources occurs after receiving the control information.

19. The method of claim 18, wherein the indicator comprises an assignment index (DAI) indicator, feedback resource indicator, or the feedback gap indicator.

20. The method of claim 17, wherein:
the first copy of the feedback message is transmitted to a first transmission reception point using the first quasi co-location relationship indicating the first beam direction associated with the first transmission reception point; and
the second copy of the feedback message is transmitted to a second transmission reception point using the second quasi co-location relationship indicating the second beam direction associated with the second transmission reception point.

* * * * *